United States Patent
Kimura

(10) Patent No.: US 10,406,732 B2
(45) Date of Patent: Sep. 10, 2019

(54) THREE-DIMENSIONAL IMAGE DATA GENERATION SYSTEM, THREE-DIMENSIONAL IMAGE DATA GENERATION METHOD, AND COMPUTER-READABLE RECORDING MEDIUM

(71) Applicant: CASIO COMPUTER CO., LTD., Shibuya-ku, Tokyo (JP)

(72) Inventor: Satoshi Kimura, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/891,772

(22) Filed: Feb. 8, 2018

(65) Prior Publication Data
US 2018/0257273 A1  Sep. 13, 2018

(30) Foreign Application Priority Data

Mar. 9, 2017  (JP) ................. 2017-044591

(51) Int. Cl.
| | |
|---|---|
| *G06K 15/00* | (2006.01) |
| *B29C 44/60* | (2006.01) |
| *G06K 15/02* | (2006.01) |
| *H04N 1/393* | (2006.01) |
| *H04N 1/407* | (2006.01) |
| *B29C 44/34* | (2006.01) |
| *B29K 105/00* | (2006.01) |
| *B29C 44/02* | (2006.01) |

(52) U.S. Cl.
CPC .......... *B29C 44/60* (2013.01); *B29C 44/3415* (2013.01); *G06K 15/021* (2013.01); *G06K 15/028* (2013.01); *H04N 1/393* (2013.01); *H04N 1/407* (2013.01); *H04N 1/4074* (2013.01); *B29C 44/022* (2013.01); *B29C 44/3484* (2013.01); *B29K 2105/0047* (2013.01)

(58) Field of Classification Search
CPC . B29C 44/60; B29C 44/3415; B29C 44/3484; B29C 44/022; H04N 1/4074; H04N 1/407; H04N 1/393; G06K 15/028; G06K 15/021; B29K 2105/0047
See application file for complete search history.

(56) References Cited

U.S. PATENT DOCUMENTS

| | | | | |
|---|---|---|---|---|
| 2010/0302598 | A1* | 12/2010 | Takemoto | H04N 1/409 358/3.27 |
| 2014/0110887 | A1* | 4/2014 | Horiuchi | B41J 3/28 264/413 |
| 2015/0375546 | A1* | 12/2015 | Yamasaki | B33Y 50/00 347/110 |

FOREIGN PATENT DOCUMENTS

| | | |
|---|---|---|
| JP | 64028660 A | 1/1989 |
| JP | 2001150789 A | 6/2001 |
| JP | 2001150812 A | 6/2001 |

(Continued)

*Primary Examiner* — Neil R McLean
(74) *Attorney, Agent, or Firm* — Holtz, Holtz & Volek PC

(57) ABSTRACT

A three-dimensional image data generation system includes: an editing unit configured to edit grayscale image data in which a density level for specifying an foaming height of a thermally expandable sheet is set for each coordinate in a planar direction; and a conversion unit configured to, when the editing unit changes a size in the planar direction of an image region included in the grayscale image data, convert the density level in correspondence with a ratio of the image region between before and after the change.

17 Claims, 25 Drawing Sheets

(56) References Cited

FOREIGN PATENT DOCUMENTS

| JP | 2004349736 A | 12/2004 |
|---|---|---|
| JP | 2005032144 A | 2/2005 |

\* cited by examiner

THREE-DIMENSIONAL IMAGE DATA GENERATION SYSTEM, THREE-DIMENSIONAL IMAGE DATA GENERATION METHOD, AND COMPUTER-READABLE RECORDING MEDIUM

CROSS-REFERENCE TO RELATED APPLICATIONS

This application is based upon and claims the benefit of priority from the prior Japanese Patent Application No. 2017-044591, filed on Mar. 9, 2017, the entire contents of which are incorporated herein by reference.

BACKGROUND OF THE INVENTION 1. Field of the Invention

The present invention relates to a three-dimensional image data generation system, a three-dimensional image data generation method, and a computer-readable recording medium. 2. Description of the Related Art The following method is conventionally known: An electromagnetic wave-heat conversion layer for converting an electromagnetic wave to heat is formed, by printing, on a medium (e.g. thermally expandable sheet) having an expansion layer that expands according to the amount of absorbed heat on one side. The site of the expansion layer where the electromagnetic wave-heat conversion layer is formed on the medium is then expanded by irradiation with an electromagnetic wave so as to rise outward, thus forming a three-dimensional image (for example, see Japanese Patent Application Laid-Open No. S64-28660 and Japanese Patent Application Laid-Open No. 2001-150812).

SUMMARY OF THE INVENTION

A three-dimensional image data generation system according to the present invention includes: an editing unit configured to edit grayscale image data in which a density level for specifying an foaming height of a thermally expandable sheet is set for each coordinate in a planar direction; and a conversion unit configured to, when the editing unit changes a size in the planar direction of an image region included in the grayscale image data, convert the density level in correspondence with a ratio of the image region between before and after the change.

A three-dimensional image data generation method according to the present invention includes: an editing step of editing grayscale image data in which a density level for specifying an foaming height of a thermally expandable sheet is set for each coordinate in a planar direction; and a conversion step of, when the editing step changes a size in the planar direction of an image region included in the grayscale image data, converting the density level in correspondence with a ratio of the image region between before and after the change.

A computer-readable recording medium according to the present invention is a non-transitory computer-readable recording medium having stored thereon a program executable by a computer of a three-dimensional image data generation system, the program causing the computer to perform a procedure including: an editing process of editing grayscale image data in which a density level for specifying an foaming height of a thermally expandable sheet is set for each coordinate in a planar direction; and a conversion process of, when a size in the planar direction of an image region included in the grayscale image data is changed, converting the density level in correspondence with a ratio of the image region between before and after the change.

DETAILED DESCRIPTION OF THE INVENTION

Embodiments for carrying out the present invention are described in detail below, with reference to drawings.

Figure 1:
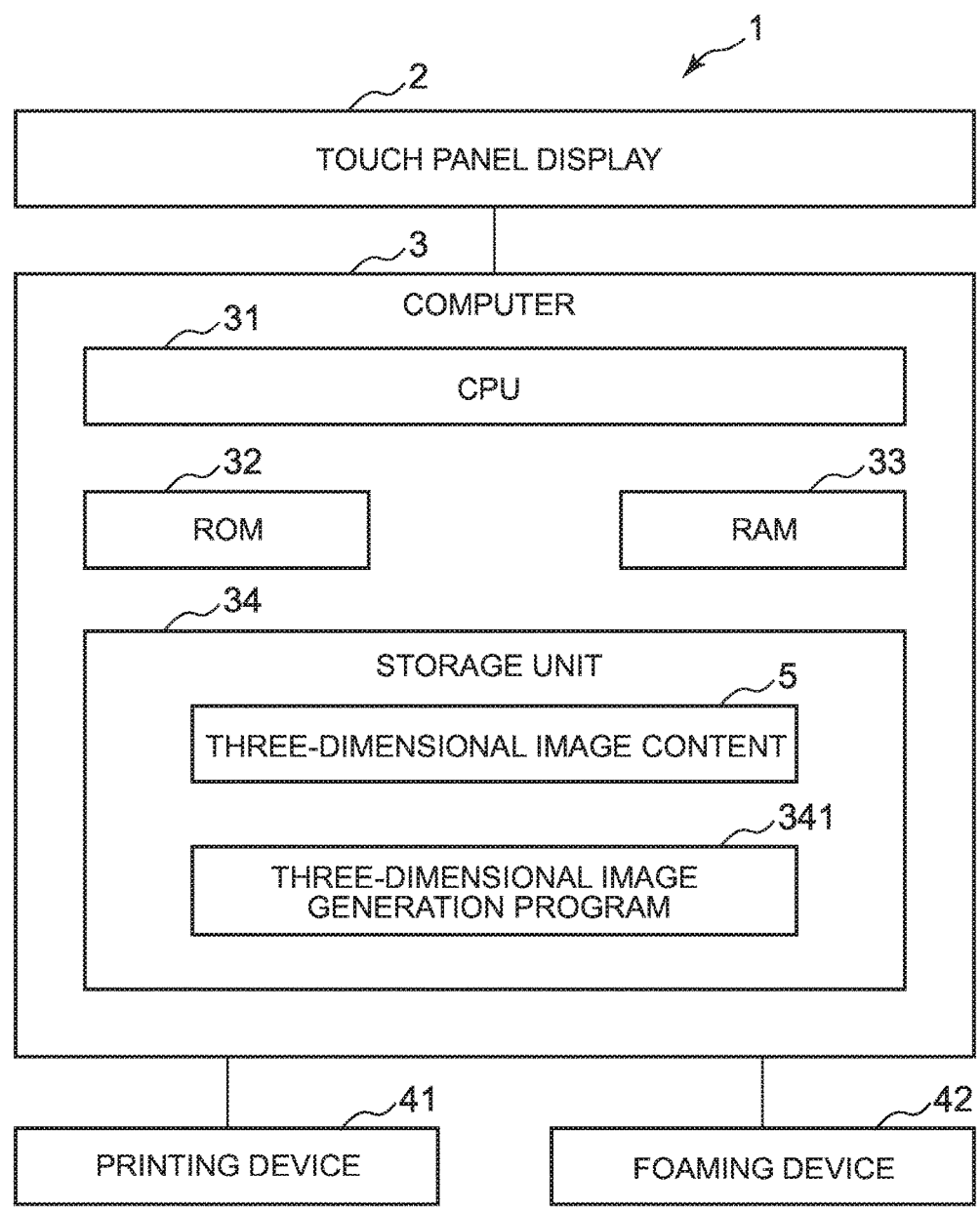
FIG. 1 is a block diagram schematically illustrating a three-dimensional image formation system.

FIG. 1 is a block diagram schematically illustrating a three-dimensional image formation system 1.

In the three-dimensional image formation system 1 (three-dimensional image data generation system), a computer 3 is connected to a touch panel display 2, a printing device 41, and a foaming device 42. The three-dimensional image formation system 1 prints carbon black on the below-mentioned thermally expandable sheet as a grayscale image, and then irradiates the thermally expandable sheet with near-infrared light or visible light. The three-dimensional image formation system 1 can thus expand the region of the thermally expandable sheet where carbon black is printed, to form a three-dimensional image. In this embodiment, the thermally expandable sheet is conceptually included in paper or a medium.

The computer 3 includes a central processing unit (CPU) 31, a read only memory (ROM) 32, a random access memory (RAM) 33, and a storage unit 34, and controls the printing device 41 and the foaming device 42. The storage unit 34 stores three-dimensional image content 5 for forming the three-dimensional image on the thermally expandable sheet, and a three-dimensional image generation program 341 for generating the three-dimensional image from the thermally expandable sheet. The CPU 31 executes the three-dimensional image generation program 341, to edit the three-dimensional image content 5 and control the printing device 41 and the foaming device 42.

The touch panel display 2 has a touch panel attached to a liquid crystal display panel, and is used to operate the three-dimensional image formation system 1. The computer 3 and the touch panel display 2 function as a display unit that guide-displays an operation procedure of the printing device 41 or the foaming device 42.

The printing device 41 is an inkjet printing device, and prints, on the front side and/or the back side of the thermally expandable sheet which is a medium, a grayscale image by ink of carbon black (predetermined printing material). The printing device 41 is not limited to an inkjet printing device and may be a laser printing device, and the predetermined printing material may be a combination of toner and a developer.

The foaming device 42, while conveying the thermally expandable sheet, irradiates the thermally expandable sheet with visible light or near-infrared light, to generate heat in the part where the grayscale image (electromagnetic wave-heat conversion layer) by carbon black is formed. The foaming device 42 includes, for example, a halogen heater and a conveyance unit (not illustrated), and irradiates one side of the thermally expandable sheet with light energy.

In a procedure of inserting the medium into the printing device 41, the touch panel display 2 displays a guide screen for an operation of inserting the medium into the printing device 41. An image corresponding to the medium and an image corresponding to the three-dimensional image formation system 1 are guide-displayed on the guide screen.

In a procedure of inserting the medium into the foaming device 42, the touch panel display 2 displays a guide screen for an operation of inserting the medium into the foaming device 42. An image corresponding to the medium and an image corresponding to the three-dimensional image formation system 1 are guide-displayed on the guide screen, with the display position relationship being reversed with respect to the guide screen for the operation of inserting the medium into the printing device 41.

In this embodiment, the three-dimensional image content 5 corresponding to each paper size type usable in the three-dimensional image formation system 1 is generated beforehand. These three-dimensional image content 5 may be stored in the storage unit 34, or uploaded to a server (not illustrated) accessible via a network.

In the three-dimensional image formation system 1, the user can select a usable paper size on the touch panel display 2. The user can also display a plurality of three-dimensional image content 5 prepared beforehand on the touch panel display 2, and select any of the displayed three-dimensional image content 5. The three-dimensional image content 5 selected by the user is copy-pasted to any position in a paper surface area representing the paper size selected by the user. Here, only three-dimensional image content 5 for A4 size is selectable for a paper surface area of A4 paper size.

The three-dimensional image content 5 copy-pasted to the paper surface area may be enlarged or reduced to any size after the pasting. The new three-dimensional image content 5 obtained in this way is converted to printing data, and output to the printing device 41.

When resizing the three-dimensional image content 5, the CPU 31 resizes picture pattern data constituting picture data, based on size change information from original data. For grayscale image data, the CPU 31 performs resizing in the planar direction based on the size change information from the original data, and also changes the density of grayscale image based on the size change ratio. The relationship between the size change and the density change will be described in detail later, with reference to FIGS. 13 to 15, 16 to 18, etc. The CPU 31 then converts the three-dimensional image content 5 to printing data, and prints it on the paper by the printing device 41, thus forming a grayscale image. The CPU 31 foams the paper on which the grayscale image is printed, by the foaming device 42. A desired result can thus be obtained.

Here, any part of the three-dimensional image content 5 selected, determined, and pasted to the paper surface area may be further selected and enlarged and print-displayed on the paper. The printing data in such a case is generated by changing the grayscale image data according to the size ratio of the selected area and the further enlarged display area.

The CPU 31 may change the density of grayscale image, without resizing in the planar direction. Such a density change will be described in detail later, with reference to FIGS. 19 to 36, etc. The CPU 31 then converts the three-dimensional image content 5 to printing data, and prints it on the paper by the printing device 41, thus forming a grayscale image. The CPU 31 foams the paper on which the grayscale image is printed, by the foaming device 42. A desired result can thus be obtained.

Figure 2:
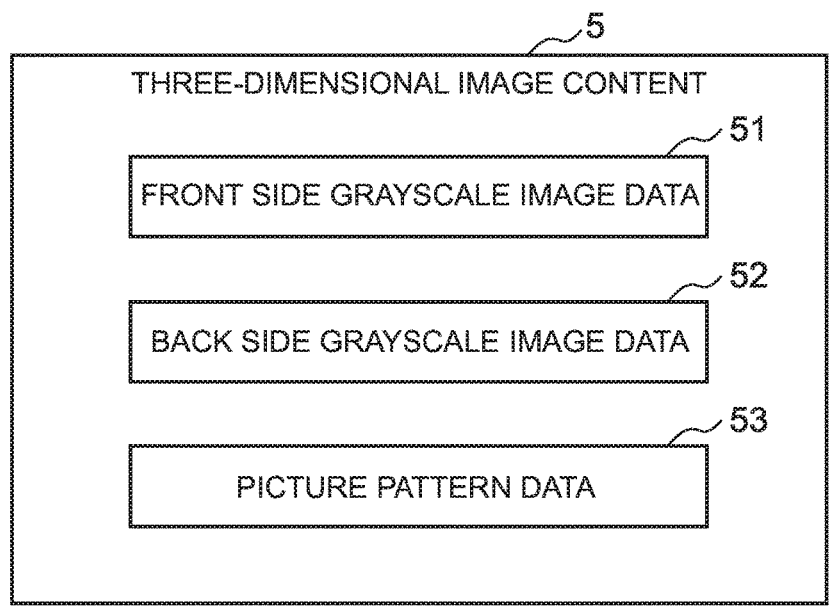
FIG. 2 is a diagram illustrating the data structure of three-dimensional image content.

FIG. 2 is a diagram illustrating the data structure of the three-dimensional image content 5.

The three-dimensional image content 5 generated for a three-dimensional picture includes front side grayscale image data 51, back side grayscale image data 52, and picture pattern data 53.

The front side grayscale image data 51 is grayscale image data printed on the front side of the paper to foam the paper. The back side grayscale image data 52 is grayscale image data printed on the back side of the paper to foam the paper. The picture pattern data 53 relates to a picture pattern, and is color data printed on the front side of the paper.

Figure 3:
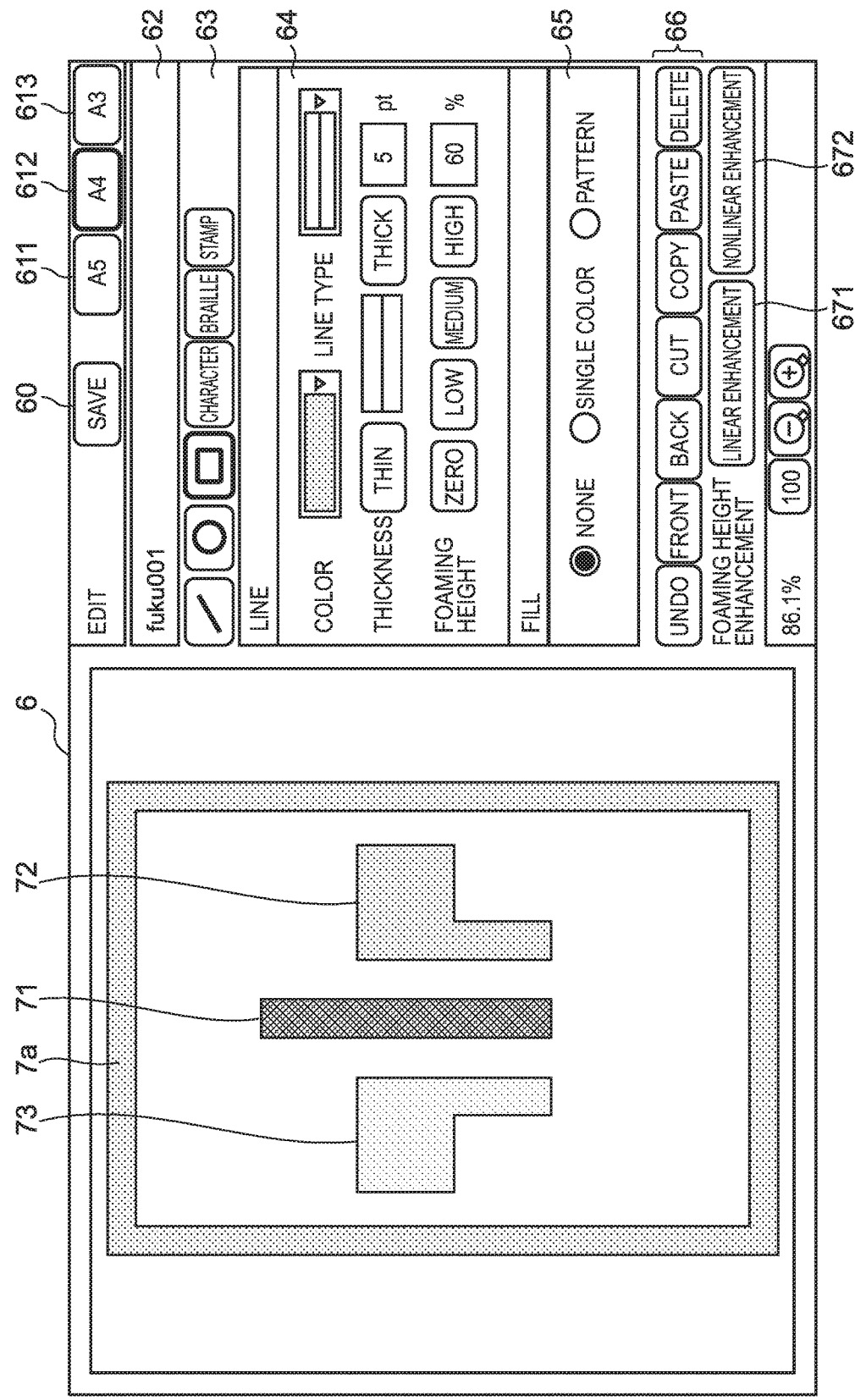
FIG. 3 is a diagram illustrating an example of a three-dimensional image editing screen.

FIG. 3 is a diagram illustrating an example of an editing screen 6 for the three-dimensional image content 5. The editing screen 6 has a content display region 7a on the left, and displays, on the right, various operation elements for editing content displayed in the content display region 7a. The content display region 7a is A4 size, and includes protrusion regions 71 to 73. The editing screen 6 functions as an editing unit configured to edit the three-dimensional image content 5 (three-dimensional image data) of a predetermined size including grayscale image data in which a density level for specifying the foaming height of the thermally expandable sheet is set for each coordinate in the planar direction.

In the first row on the right of the editing screen 6, "edit" is displayed, and a save button 60, an A5 designation button 611, an A4 designation button 612, and an A3 designation button 613 are displayed on its right.

The save button 60 is a button for saving the content displayed in the content display region 7a to the storage unit 34 (see FIG. 1).

The A5 designation button 611 is a button for designating A5 size as the size in the planar direction of the content displayed in the content display region 7a. The A4 designation button 612 is a button for designating A4 size as the size in the planar direction of the content displayed in the content display region 7a. The A3 designation button 613 is a button for designating A3 size as the size in the planar direction of the content displayed in the content display region 7a. In this example, the A4 designation button 612 is highlighted, indicating that A4 size is designated.

In the second row on the right of the editing screen 6, a title region 62 is provided. Content title "fuku001" is displayed in the title region 62.

In the third row on the right of the editing screen 6, an object selection button group 63 is provided. The object selection button group 63 includes a line selection button, a circle selection button, a rectangle selection button, a character selection button, a braille selection button, and a stamp selection button, in this order from left to right.

The line selection button is a button for selecting lines as the editing target. The circle selection button is a button for selecting circles as the editing target. The rectangle selection button is a button for selecting rectangles as the editing target. The character selection button is a button for selecting character strings as the editing target. The braille selection button is a button for selecting braille as the editing target. The stamp selection button is a button for selecting various symbols as the editing target. The object selection button group 63 is selected in an alternative manner, and the selection result is highlighted. A region for setting the attributes of the selected object is provided below the object selection button group 63.

In this example, the rectangle selection button is highlighted, indicating that a rectangle is selected by the user. A line attribute region 64 for setting lines forming the rectangle and a fill region 65 for setting attributes when filling the rectangle are provided below it.

The line attribute region 64 has a color selection menu, a line type menu, a button for increasing the line thickness and a button for decreasing the line thickness, and "zero", "low", "medium", and "high" buttons for setting the foaming height.

When the foaming height "zero" button is tapped, the density level of the lines in the grayscale image data is 0%. When the foaming height "low" button is tapped, the density level of the lines in the grayscale image data is 30%. When the foaming height "medium" button is tapped, the density level of the lines in the grayscale image data is 60%. When the foaming height "high" button is tapped, the density level of the lines in the grayscale image data is 90%.

The fill region 65 has "none", "single color", and "pattern" radio buttons. When the "none" radio button is selected, the inside region defined by the lines is not filled. When the "single color" radio button is selected, the inside region defined by the lines is filled with a single color. When the "pattern" radio button is selected, the CPU 31 fills the inside region defined by the lines with a dither pattern or the like. In this example, the "none" radio button is selected.

An editing button group 66 is provided below the fill region 65. The editing button group 66 includes "undo", "front", "back", "cut", "copy", "paste", and "delete" buttons.

The "undo" button is a button for canceling the immediately previous editing operation and restoring the original state. The "front" button is a button for preferentially displaying the object relative to the other objects. The "back" button is a button for preferentially displaying the other objects relative to the object.

The "cut" button is a button for cutting and removing the object from the content and storing it in a temporary storage region (e.g. clipboard). The "copy" button is a button for storing the object in the temporary storage region. The "paste" button is a button for pasting the object stored in the temporary storage region. The "delete" button is a button for deleting the object.

Buttons relating to foaming height enhancement are provided below the editing button group 66. The buttons relating to foaming height enhancement are a linear enhancement button 671 and a nonlinear enhancement button 672.

When the user taps the linear enhancement button 671, the CPU 31 linearly enhances the foaming height of the content. When the user taps the nonlinear enhancement button 672, the CPU 31 nonlinearly enhances the foaming height of the content.

Figure 4:
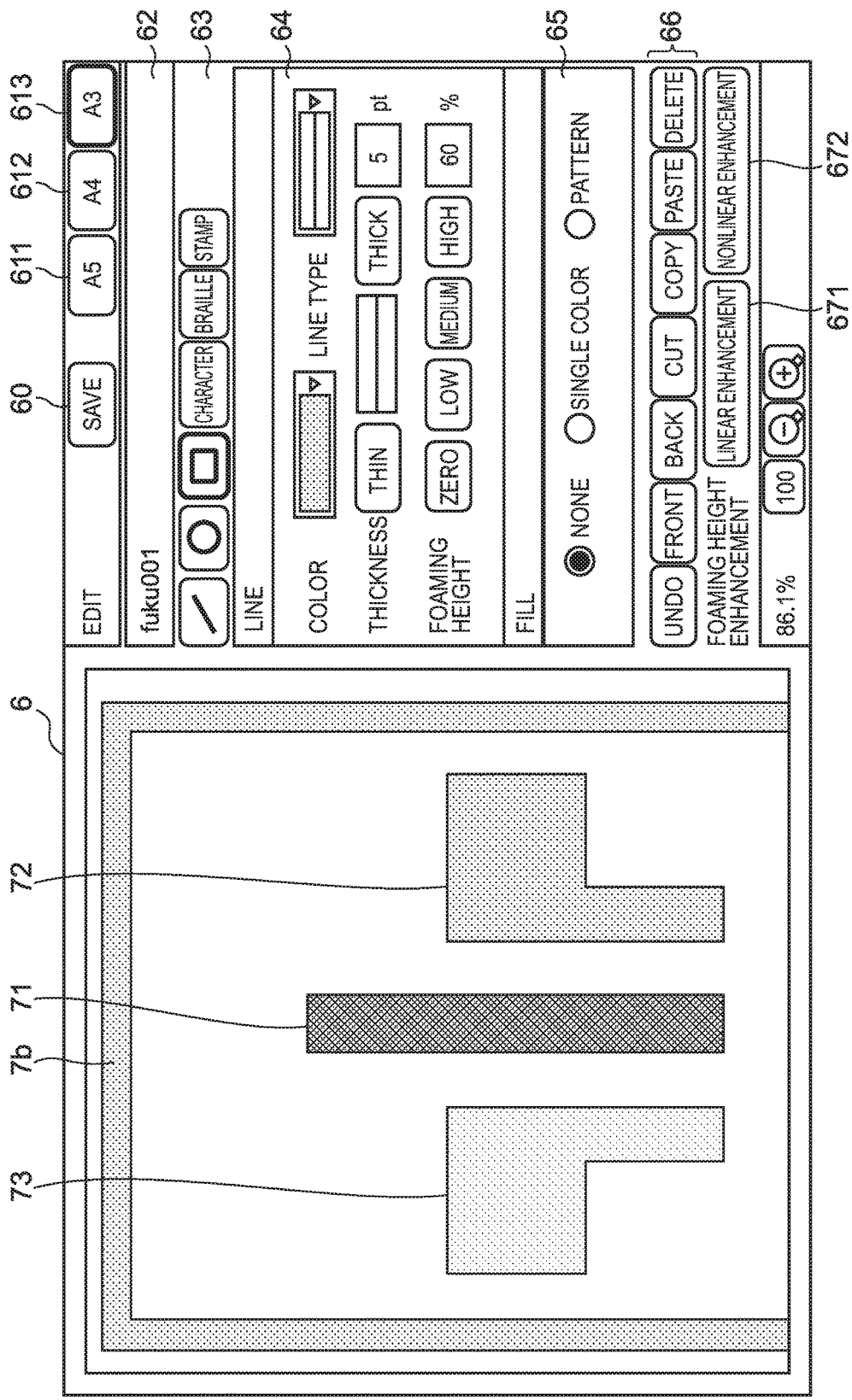
FIG. 4 is a diagram illustrating an example of the editing screen when resizing a three-dimensional image to A3 size.

FIG. 4 is a diagram illustrating an example of the editing screen 6 when resizing the three-dimensional image to A3 size.

In the editing screen 6, the A3 designation button 613 is highlighted, indicating that A3 size is designated. The content displayed in the content display region 7b has been resized from A4 size illustrated in FIG. 3, to A3 size. The enlargement ratio associated with the resizing is about 140%. This process is described in detail below, with reference to FIG. 5.

Figure 5:
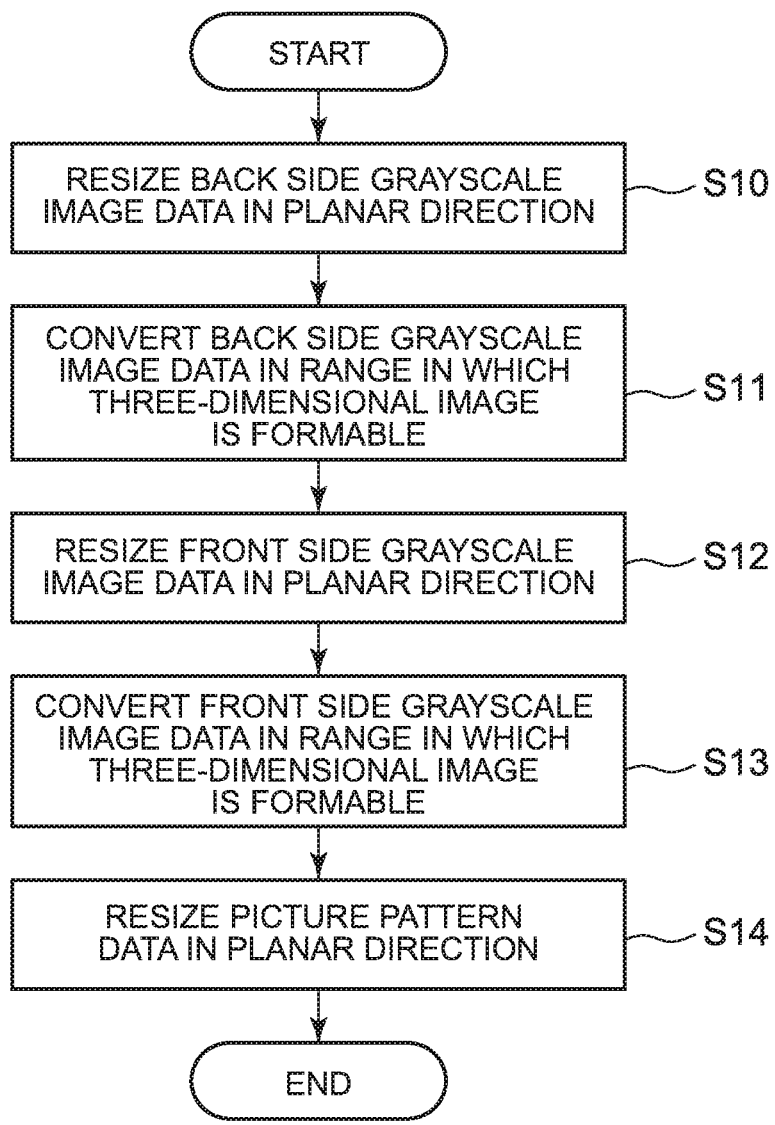
FIG. 5 is a flowchart illustrating a three-dimensional image resizing process in a first embodiment.

FIG. 5 is a flowchart illustrating a three-dimensional image resizing process in the first embodiment.

First, the CPU 31 resizes the back side grayscale image data 52 in the planar direction (step S10), and further converts the back side grayscale image data 52 in the range in which a three-dimensional image is formable (step S11). The CPU 31 adjusts the density level of the back side grayscale image data 52 with reference to the enlargement/reduction ratio in the planar direction, so that the obtained three-dimensional image is resized in the height direction. If the three-dimensional image cannot be formed in the height direction due to, for example, saturation of the density level, the CPU 31 limits the density level to the saturation value. This process will be described in detail later, with reference to FIGS. 13 to 18.

The CPU 31 then resizes the front side grayscale image data 51 in the planar direction (step S12), and further converts the front side grayscale image data 51 in the range in which a three-dimensional image is formable (step S13). The CPU 31 adjusts the density level of the front side grayscale image data 51 with reference to the enlargement/reduction ratio in the planar direction, so that the obtained three-dimensional image is resized in the height direction. If the three-dimensional image cannot be formed in the height direction due to, for example, saturation of the density level of the front side grayscale image data 51, saturation of the density level of the back side grayscale image data 52, or saturation of the foaming height when combining the front side grayscale image data 51 and the back side grayscale image data 52, the CPU 31 limits the density level to the saturation value.

Lastly, the CPU 31 resizes the picture pattern data 53 in the planar direction (step S14), and ends the resizing process in FIG. 5.

The CPU 31 thus functions as a conversion unit configured to, when the size of the front side grayscale image data 51 and the back side grayscale image data 52 in the planar direction is changed, convert the density level in correspondence with the ratio of the image region between before and after the change.

Figure 6:
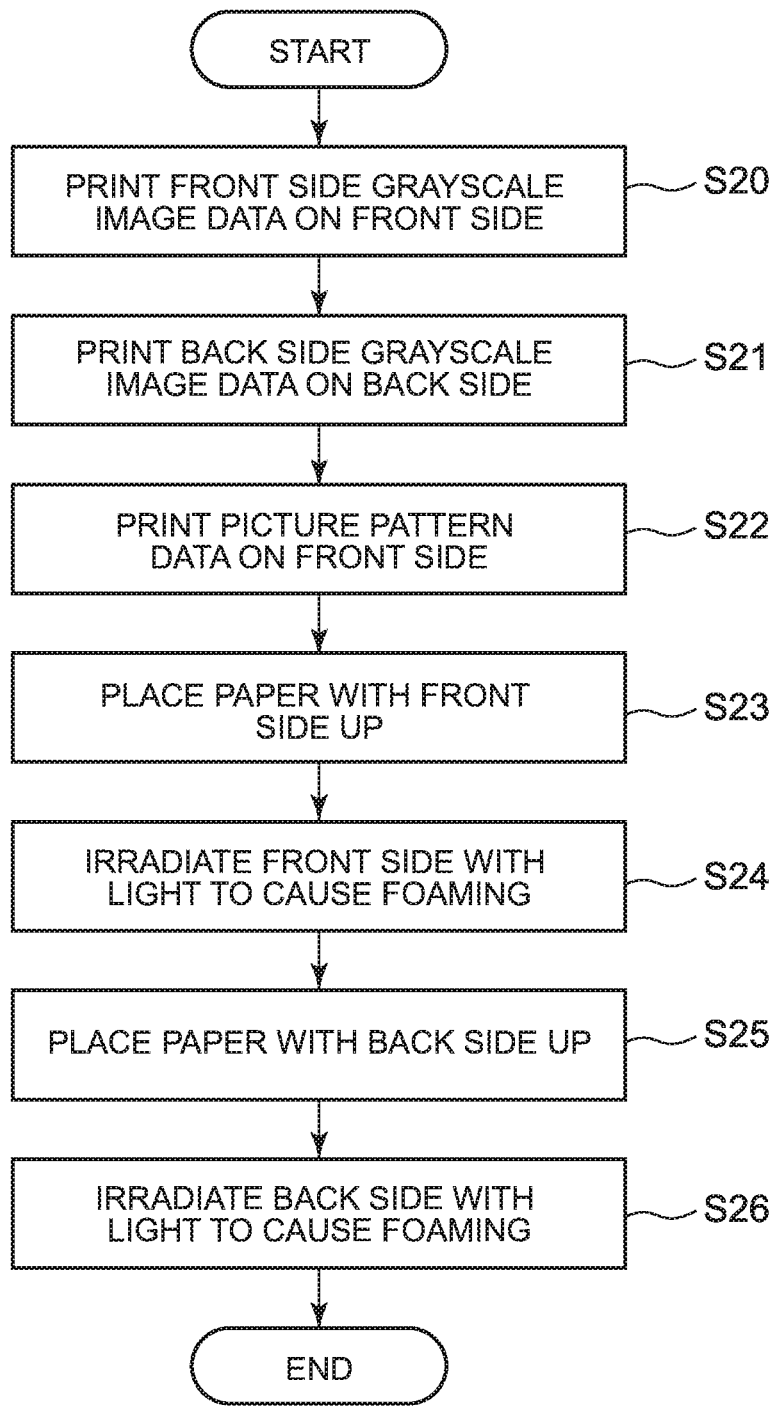
FIG. 6 is a flowchart illustrating a three-dimensional image printing process and foaming process.

FIG. 6 is a flowchart illustrating a three-dimensional image printing process and foaming process. First, the CPU 31 outputs the front side grayscale image data 51 to the printing device 41, and causes the printing device 41 to print the front side of paper 8A (see FIG. 7) (step S20). As a result, paper 8B illustrated in FIG. 8 is formed.

Figure 8:
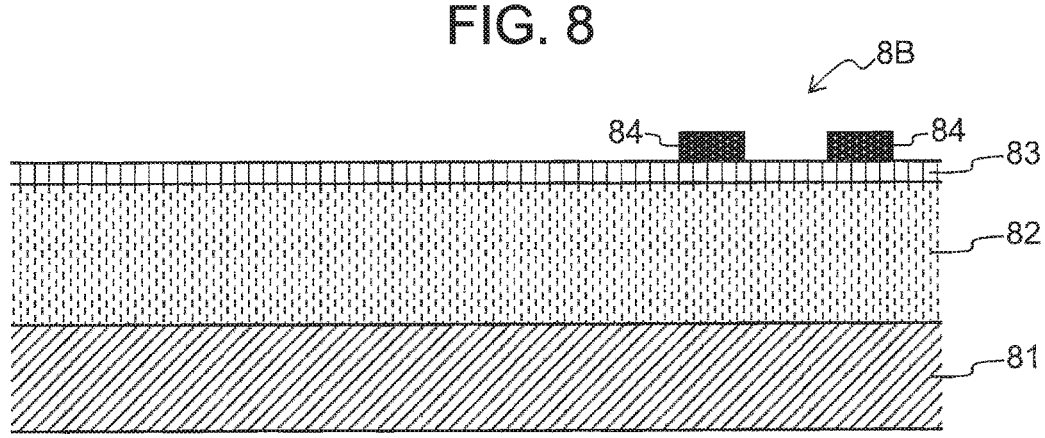
FIG. 8 is a sectional diagram of the medium after printing front side grayscale image data.
Figure 9:
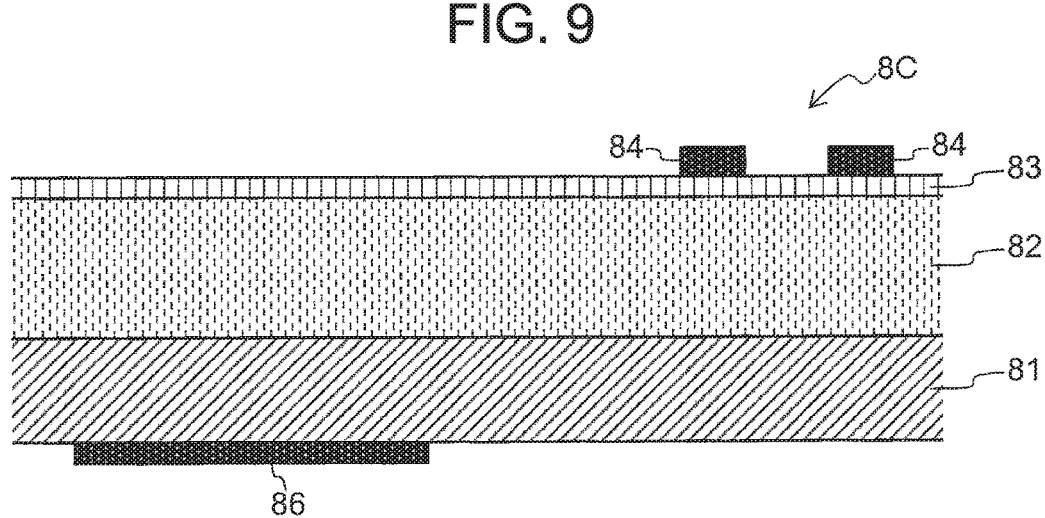
FIG. 9 is a sectional diagram of the medium after printing back side grayscale image data.

The CPU 31 then outputs the back side grayscale image data 52 to the printing device 41, and causes the printing device 41 to print the back side of the paper 8B (see FIG. 8) (step S21). As a result, paper 8C illustrated in FIG. 9 is formed.

Figure 10:
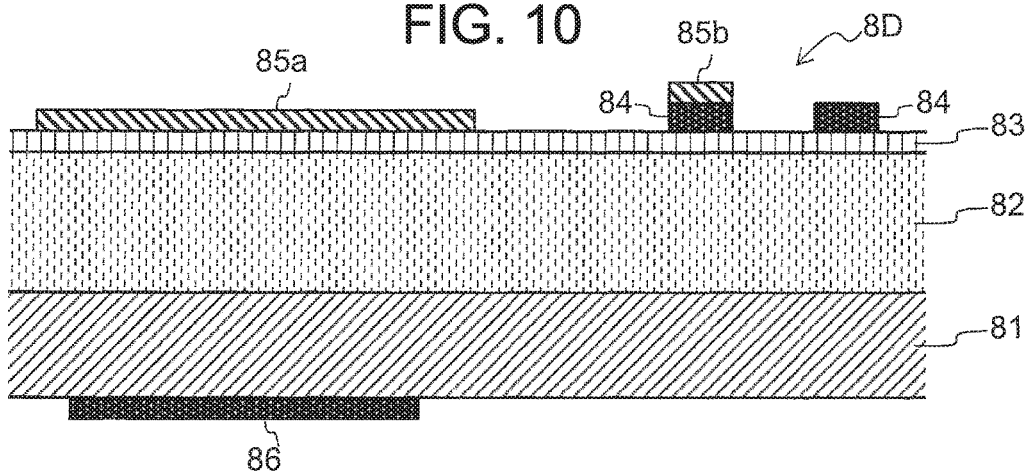
FIG. 10 is a sectional diagram of the medium after printing picture pattern data.

The CPU 31 further outputs the picture pattern data 53 to the printing device 41, and causes the printing device 41 to print the front side of the paper 8C (see FIG. 9) (step S22). As a result, paper 8D illustrated in FIG. 10 is formed.

Figure 11:
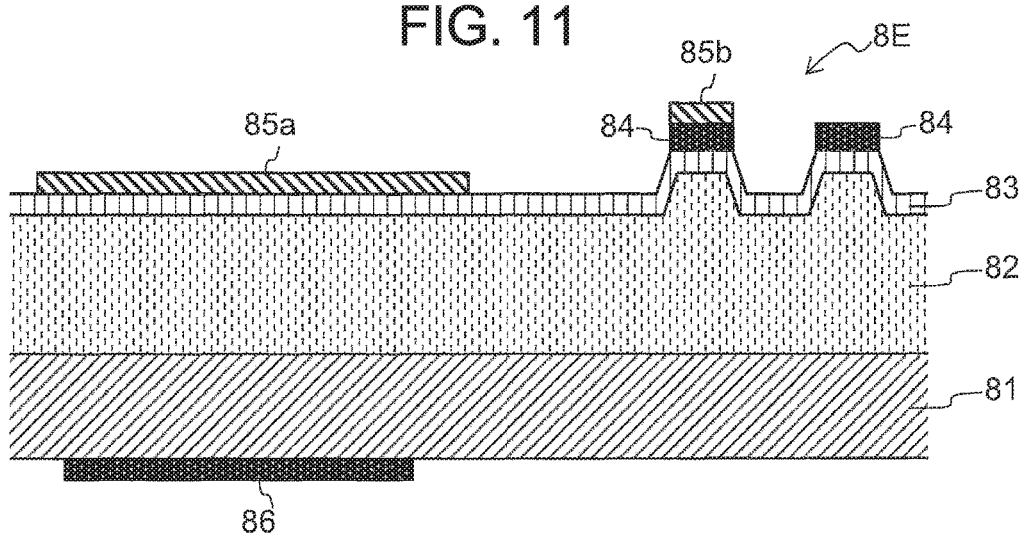
FIG. 11 is a sectional diagram of the medium after a front side foaming step.

The user places the paper in the foaming device 42 with the front side of the paper 8D up (step S23). The foaming device 42 irradiates the front side of the paper 8D with light to cause foaming (step S24). As a result, paper 8E illustrated in FIG. 11 is formed.

Figure 12:
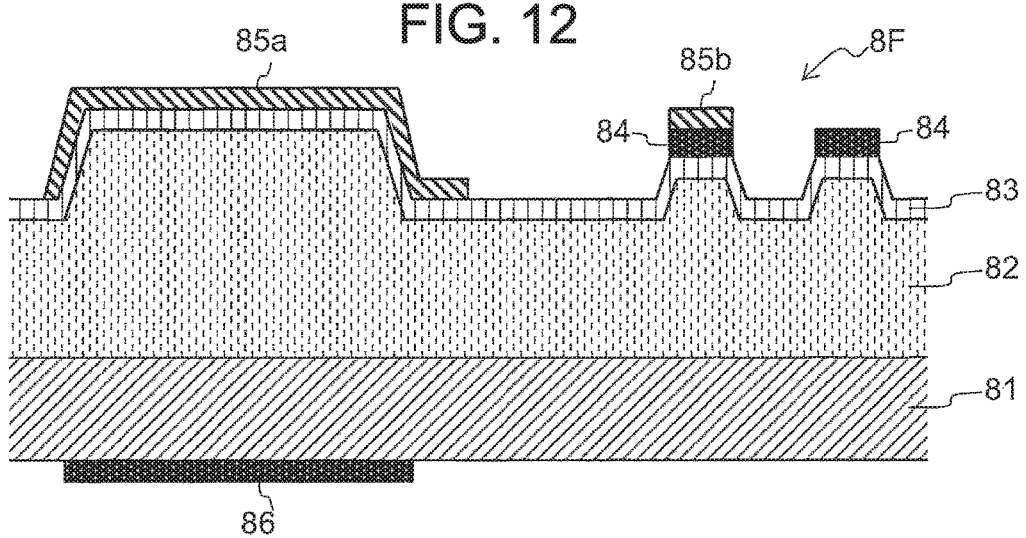
FIG. 12 is a sectional diagram of the medium after a back side foaming step.

The user further places the paper in the foaming device 42 with the back side of the paper 8E up (step S25). The foaming device 42 irradiates the back side of the paper 8E with light to cause foaming (step S26). As a result, paper 8F illustrated in FIG. 12 is formed. The paper 8F is a three-dimensional image.

The three-dimensional image (also referred to as a decorative shaped object) formed in this way can be used as a material for decorating the surface of an industrial product (e.g. walling, flooring, automotive interior, electronic equipment, etc.).

The printing process and the foaming process are described below, with reference to FIGS. 7 to 12.

Figure 7:
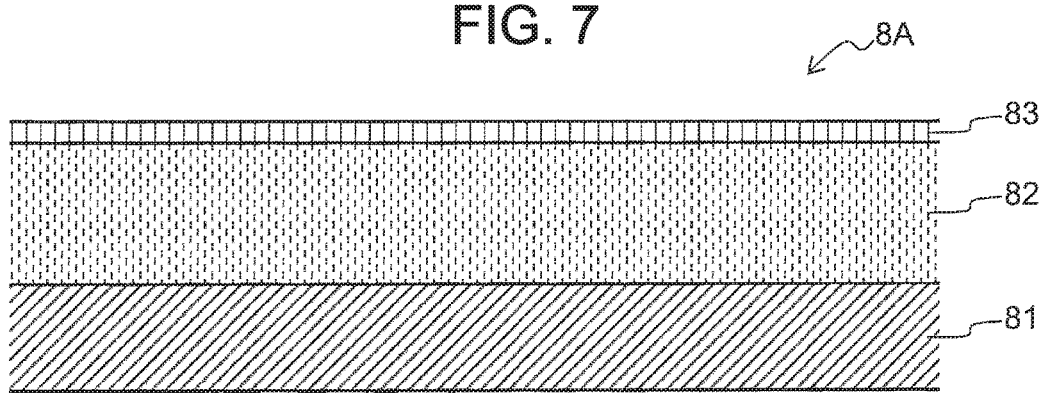
FIG. 7 is a sectional diagram of a medium before printing.

FIG. 7 is a sectional diagram of the medium before printing.

The paper 8A has a base material 81, a foaming resin layer 82, and an ink receiving layer 83 stacked in order. The paper 8A is an example of the medium that has not undergone the steps in the three-dimensional image formation system 1.

The base material 81 is made of, for example, paper, cloth such as canvas, or a panel material such as plastic, although the material is not particularly limited.

In the foaming resin layer 82, a thermal foaming agent (thermally expandable microcapsules) is distributed in a binder which is thermoplastic resin provided on the base material 81. The foaming resin layer 82 thus foams to expand according to the amount of absorbed heat.

The ink receiving layer 83 is formed with a thickness of 10 μm as an example, so as to cover the whole upper surface of the foaming resin layer 82. The ink receiving layer 83 is made of a suitable material for receiving ink for an inkjet printer, toner for a laser printer, ink of a ballpoint pen or fountain pen, graphite of a pencil, or the like and fixing it to the front side.

FIG. 8 is a sectional diagram of the medium after printing the front side grayscale image data 51.

In the paper 8B, an electromagnetic wave-heat conversion layer 84 is printed on the front side (ink receiving layer 83 side) of the paper 8A illustrated in FIG. 7. The paper 8B is an example of the medium that has undergone the step of printing the front side grayscale image data 51 in the three-dimensional image formation system 1.

The electromagnetic wave-heat conversion layer 84 is, for example, a layer printed with ink including carbon black, and converts visible light or near-infrared light (electromagnetic wave) to heat.

FIG. 9 is a sectional diagram of the medium after printing the back side grayscale image data 52.

In the paper 8C, an electromagnetic wave-heat conversion layer 86 is printed on the back side (base material 81 side) of the paper 8B illustrated in FIG. 8. The paper 8C is an example of the medium that has undergone the step of printing the front side grayscale image data 51 and the step of printing the back side grayscale image data 52 in the three-dimensional image formation system 1.

The electromagnetic wave-heat conversion layer 86 is, for example, a layer printed with ink including carbon black, and converts visible light or near-infrared light (electromagnetic wave) to heat.

FIG. 10 is a sectional diagram of the medium after printing the picture pattern data 53.

In the paper 8D, color ink layers 85a and 85b are printed on the front side (ink receiving layer 83 side) of the paper 8C illustrated in FIG. 9. The paper 8D is an example of the medium that has undergone the step of printing the front side grayscale image data 51, the step of printing the back side grayscale image data 52, and the step of printing the picture pattern data 53 in the three-dimensional image formation system 1.

The paper 8D is in a state before expanding the foaming resin layer 82 by heating, and therefore the thickness of the foaming resin layer 82 is uniform. The paper 8D is set in the paper guide of the foaming device 42, with the ink receiving layer 83 on which the electromagnetic wave-heat conversion layer 84 is printed facing up. The paper 8D is then irradiated with visible light or near-infrared light (electromagnetic wave) in the conveyance path. As a result, the foaming resin layer 82 expands by heating, and the paper 8E illustrated in FIG. 11 is formed.

FIG. 11 is a sectional diagram of the medium after the front side foaming step.

The paper 8E is an example of the medium that has undergone the front side foaming step in the three-dimensional image formation system 1.

In the first conveyance by the foaming device 42, the electromagnetic wave-heat conversion layer 84 receives light irradiation from above in the drawing, and converts the light to heat. The electromagnetic wave-heat conversion layer 84 is provided in order to form a fine three-dimensional pattern on the paper 8E. The foaming resin layer 82 directly below the electromagnetic wave-heat conversion layer 84 receives heat and foams to expand. The ink receiving layer 83, the electromagnetic wave-heat conversion layer 84, and the color ink layer 85b each have elasticity, and deform with the foaming expansion of the foaming resin layer 82. The paper 8E illustrated in FIG. 11 is thus formed.

The paper 8E is further set in the paper guide of the foaming device 42, with the base material 81 on which the electromagnetic wave-heat conversion layer 86 is printed facing up. The paper 8E is then irradiated with visible light or near-infrared light (electromagnetic wave) in the conveyance path. As a result, the foaming resin layer 82 expands by heating, and the paper 8F illustrated in FIG. 12 is formed.

FIG. 12 is a sectional diagram of the medium after the back side foaming step.

The paper 8E is an example of the medium that has undergone the back side foaming step in the three-dimensional image formation system 1.

In the second conveyance by the foaming device 42, the electromagnetic wave-heat conversion layer 86 receives light irradiation from below in the drawing, and converts the light to heat. The electromagnetic wave-heat conversion layer 86 is provided in order to form a coarse three-dimensional pattern. The foaming resin layer 82 near the electromagnetic wave-heat conversion layer 86 receives heat and foams to expand. The ink receiving layer 83, the electromagnetic wave-heat conversion layer 84, and the color ink layer 85a each have elasticity, and deform with the foaming expansion of the foaming resin layer 82. The paper 8F including a three-dimensional image is thus formed.

Enlargement resizing of the three-dimensional image content 5 is described below, with reference to FIGS. 13 to 15.

Figure 13:
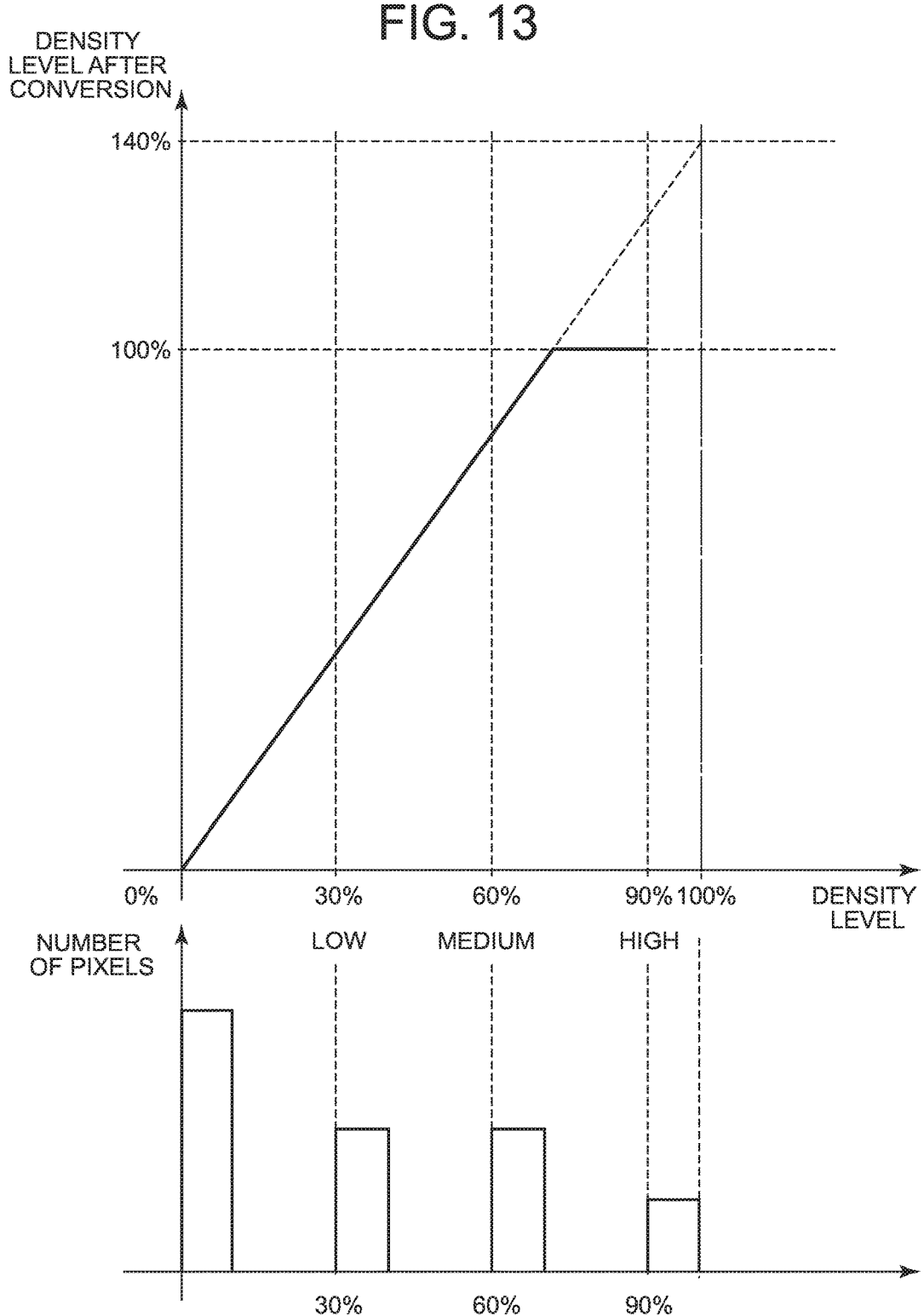
FIG. 13 is a graph illustrating a conversion function upon three-dimensional image enlargement resizing and a three-dimensional image density histogram in the first embodiment.

FIG. 13 is a graph illustrating a density conversion function upon enlargement resizing of the three-dimensional image content 5 and a three-dimensional image density histogram in the first embodiment. The conversion function when enlarging from A4 size to A3 size is illustrated here.

The three-dimensional image content 5 is enlarged to about 140% by resizing in the planar direction. Hence, by also enlarging the three-dimensional image content 5 to 140% in the height direction, the foaming height can be appropriately adjusted to attain balance between the planar direction and the height direction.

The three-dimensional image density histogram is illustrated below the conversion function graph. As indicated by the density histogram, pixels are distributed among foaming height "zero", foaming height "low", foaming height "medium", and foaming height "high".

The foaming height "high" corresponds to density level 90%. If density level 90% is increased to 140%, 100% is exceeded, and the density level cannot be kept in the density level range in which a three-dimensional image is formable. Accordingly, the CPU 31 limits the density level to 100%, and converts the density level so that the whole grayscale image data is in the density level range in which a three-dimensional image is formable. In other words, the CPU 31 corrects a density level exceeding 100%, to 100%.

Figure 14:
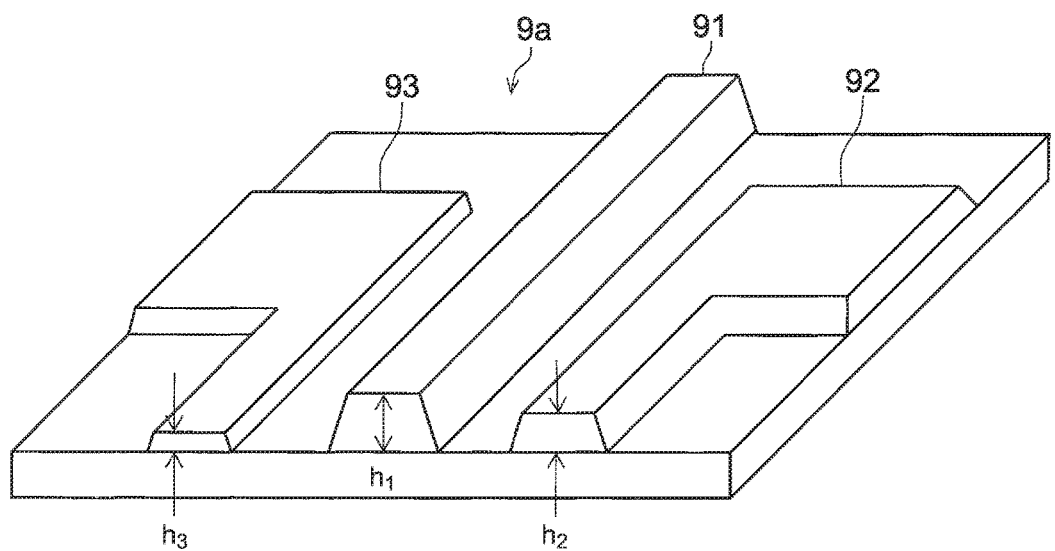
FIG. 14 is a perspective diagram illustrating a three-dimensional image before resizing.

FIG. 14 is a perspective diagram illustrating a three-dimensional image 9a before resizing.

The three-dimensional image 9a is A4 size. In FIG. 14, part of the whole three-dimensional image 9a is cut out and illustrated in a perspective view. The three-dimensional image 9a includes a center protrusion region 91, a right protrusion region 92, and a left protrusion region 93. When the saturation foaming height is 100%, the foaming height h1 of the protrusion region 91 is 90%, the foaming height h2 of the protrusion region 92 is 60%, and the foaming height h3 of the protrusion region 93 is 30%.

Figure 15:
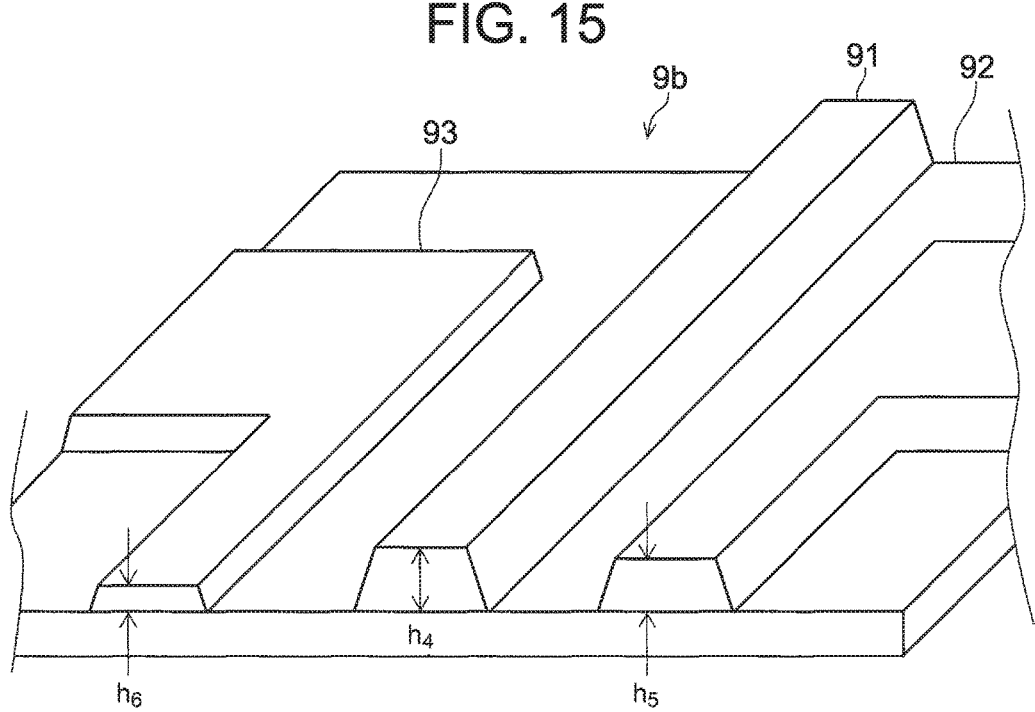
FIG. 15 is a perspective diagram illustrating the three-dimensional image after enlargement resizing.

FIG. 15 is a perspective diagram illustrating a three-dimensional image 9b after enlargement resizing.

The three-dimensional image 9b is A3 size. In FIG. 15, part of the whole three-dimensional image 9b is cut out and illustrated in a perspective view.

The three-dimensional image 9b includes the center protrusion region 91, the right protrusion region 92, and the left protrusion region 93. When the saturation foaming height is 100%, the foaming height h4 of the protrusion region 91 is 100%, the foaming height h5 of the protrusion region 92 is 84%, and the foaming height h6 of the protrusion region 93 is 42%.

By such enlargement in the planar direction and the height direction, the foaming height can be appropriately adjusted to attain balance between the planar direction and the height direction.

Reduction resizing of the three-dimensional image content 5 is described below, with reference to FIGS. 16 to 18.

Figure 16:
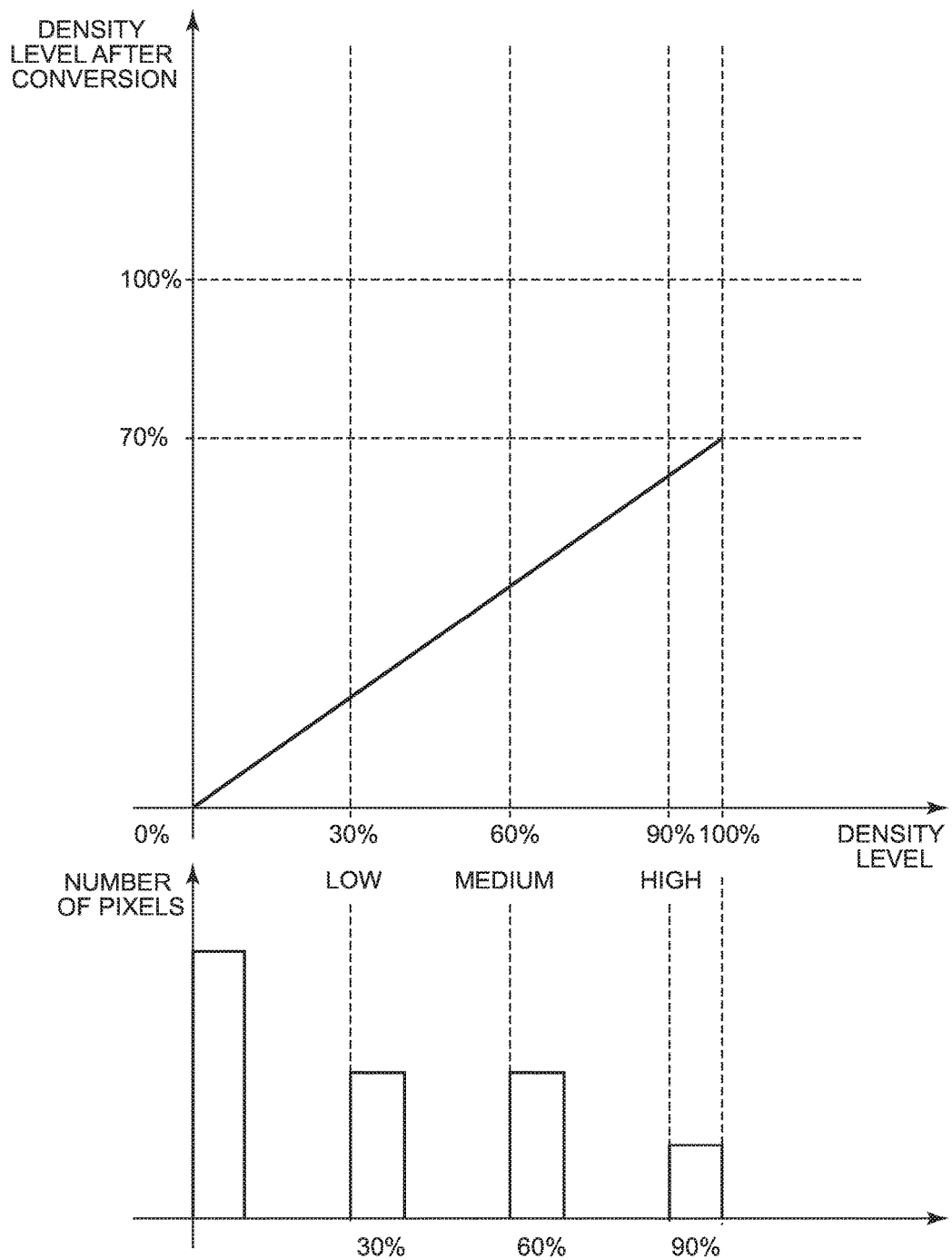
FIG. 16 is a graph illustrating a conversion function upon three-dimensional image reduction resizing and a three-dimensional image density histogram in the first embodiment.

FIG. 16 is a graph illustrating a density conversion function upon reduction resizing of the three-dimensional image content 5 and a density histogram of the three-dimensional image content 5 in the first embodiment. The density conversion function when reducing from A4 size to A5 size is illustrated here.

The three-dimensional image content 5 is reduced to 70% by resizing in the planar direction. Hence, by also reducing the three-dimensional image content 5 to 70% in the height direction, the foaming height can be appropriately adjusted to attain balance between the planar direction and the height direction.

The three-dimensional image density histogram is illustrated below the conversion function graph. As indicated by the density histogram, pixels are distributed among foaming height "zero", foaming height "low", foaming height "medium", and foaming height "high".

In reduction resizing, the density level is always kept in the density level range in which a three-dimensional image is formable, unlike enlargement resizing.

Figure 17:
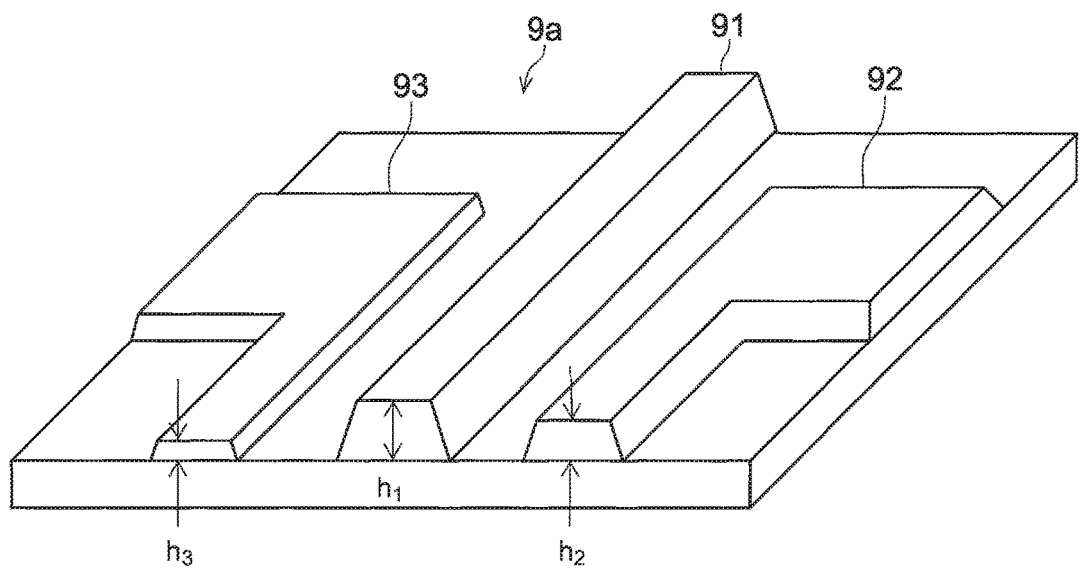
FIG. 17 is a perspective diagram illustrating a three-dimensional image before resizing.

FIG. 17 is a perspective diagram illustrating a three-dimensional image 9a before resizing, which is the same as the three-dimensional image 9a illustrated in FIG. 14.

Figure 18:
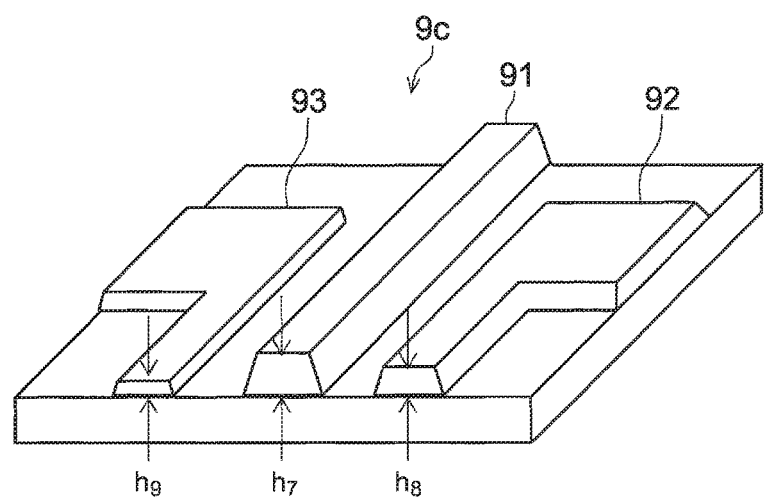
FIG. 18 is a perspective diagram illustrating the three-dimensional image after reduction resizing.

FIG. 18 is a perspective diagram illustrating a three-dimensional image 9c after reduction resizing.

The three-dimensional image 9c is A5 size. In FIG. 18, part of the whole three-dimensional image 9c is cut out and illustrated in a perspective view.

The three-dimensional image 9c includes the center protrusion region 91, the right protrusion region 92, and the left protrusion region 93. When the saturation foaming height is 100%, the foaming height h7 of the protrusion region 91 is 63%, the foaming height h8 of the protrusion region 92 is 42%, and the foaming height h9 of the protrusion region 93 is 21%.

By such reduction in the planar direction and the height direction, the foaming height can be appropriately adjusted to attain balance between the planar direction and the height direction.

The present invention is not limited to the case of converting the density level in response to enlargement resizing. The present invention also includes the case of converting density or enhancing the foaming height by density conversion when, for some reason, generated, converted, edited, or captured data is not in the density level range in which a three-dimensional image is formable. An embodiment of density conversion not involving resizing is described below.

In the embodiment illustrated in FIGS. 13 to 18, in the case of size-changing the three-dimensional image content 5 by enlargement/reduction or the like, the three-dimensional image content 5 is resized in the planar direction and also the density is changed so as to resize the foaming height, based on the size change information. This saves the user from having to re-generate the three-dimensional image content 5, and an expression utilizing irregularities can be realized without unnaturalness even when the size is changed.

A second embodiment in which conversion is performed so that a density histogram of grayscale image data is distributed throughout the whole density range is described below, with reference to FIGS. 19 to 21. It is assumed in the second embodiment that grayscale image data can be designated in units of 10%.

A three-dimensional image height enhancement process is described below, with reference to FIGS. 19 to 21.

The foaming height of a three-dimensional image is not limited to discrete setting such as "low", "medium", and "high", but various gray level expressions including gradation are possible. Ideally, a three-dimensional image with foaming height 0% to 100% can be formed in correspondence with density level 0% to 100%. By fully using the density level range from 0% to 100% in three-dimensional image formation, the foaming height range can be widened to obtain a sharp three-dimensional image.

Figure 19:
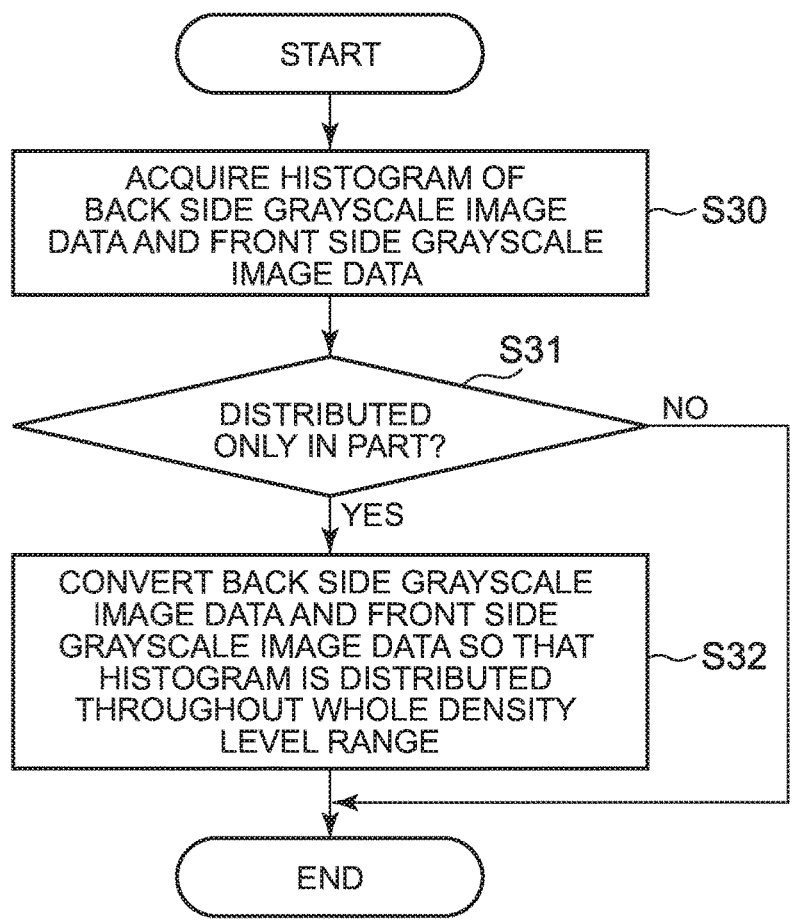
FIG. 19 is a flowchart illustrating a three-dimensional image height enhancement process in a second embodiment.

FIG. 19 is a flowchart illustrating a three-dimensional image height enhancement process in the second embodiment.

First, the CPU 31 acquires the density histogram of the back side grayscale image data 52 and the front side grayscale image data 51 (step S30). An example of this density histogram is illustrated in the below-mentioned FIGS. 20 and 23.

Figure 23:
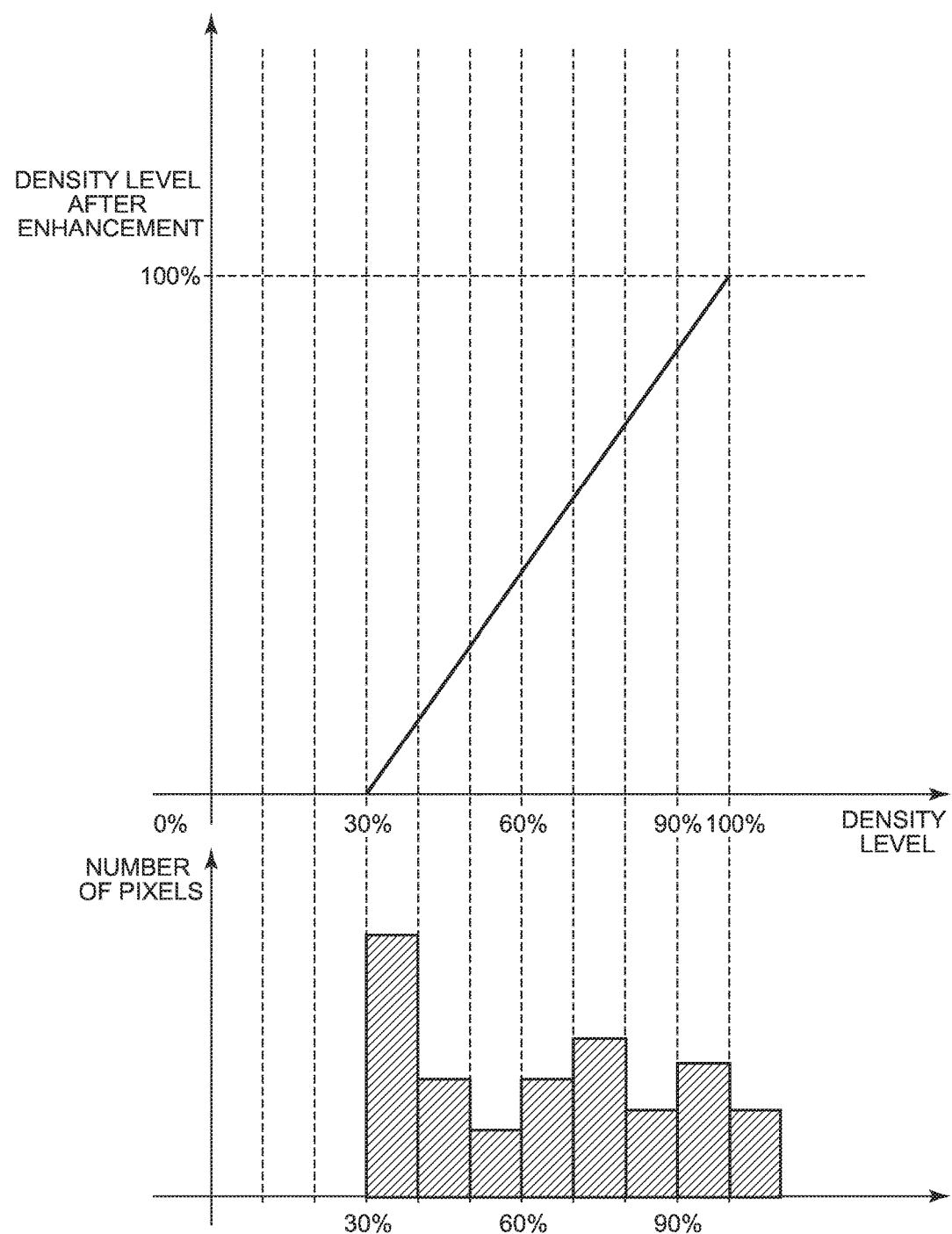
FIG. 23 is a graph illustrating another example of a conversion function upon a three-dimensional image height adjustment process and a three-dimensional image density histogram.

The CPU 31 then determines whether or not the acquired density histogram is distributed only in part of the density region. If the density histogram is distributed only in part of the density region (step S31: Yes), the CPU 31 converts the back side grayscale image data 52 and the front side grayscale image data 51 so that the density histogram is distributed throughout the whole density level range (step S32). FIGS. 20 and 23 illustrate the density histogram and the conversion function for conversion in this case. When step S32 ends, the CPU 31 ends the height enhancement process in FIG. 19.

If the density histogram is distributed throughout the whole density level region (step S31: No), the CPU 31 ends the height enhancement process in FIG. 19.

The CPU 31 thus functions as a conversion unit configured to, when the size of the front side grayscale image data 51 and the back side grayscale image data 52 in the planar direction is changed, convert the density level in correspondence with the ratio of the image region between before and after the change.

Figure 20:
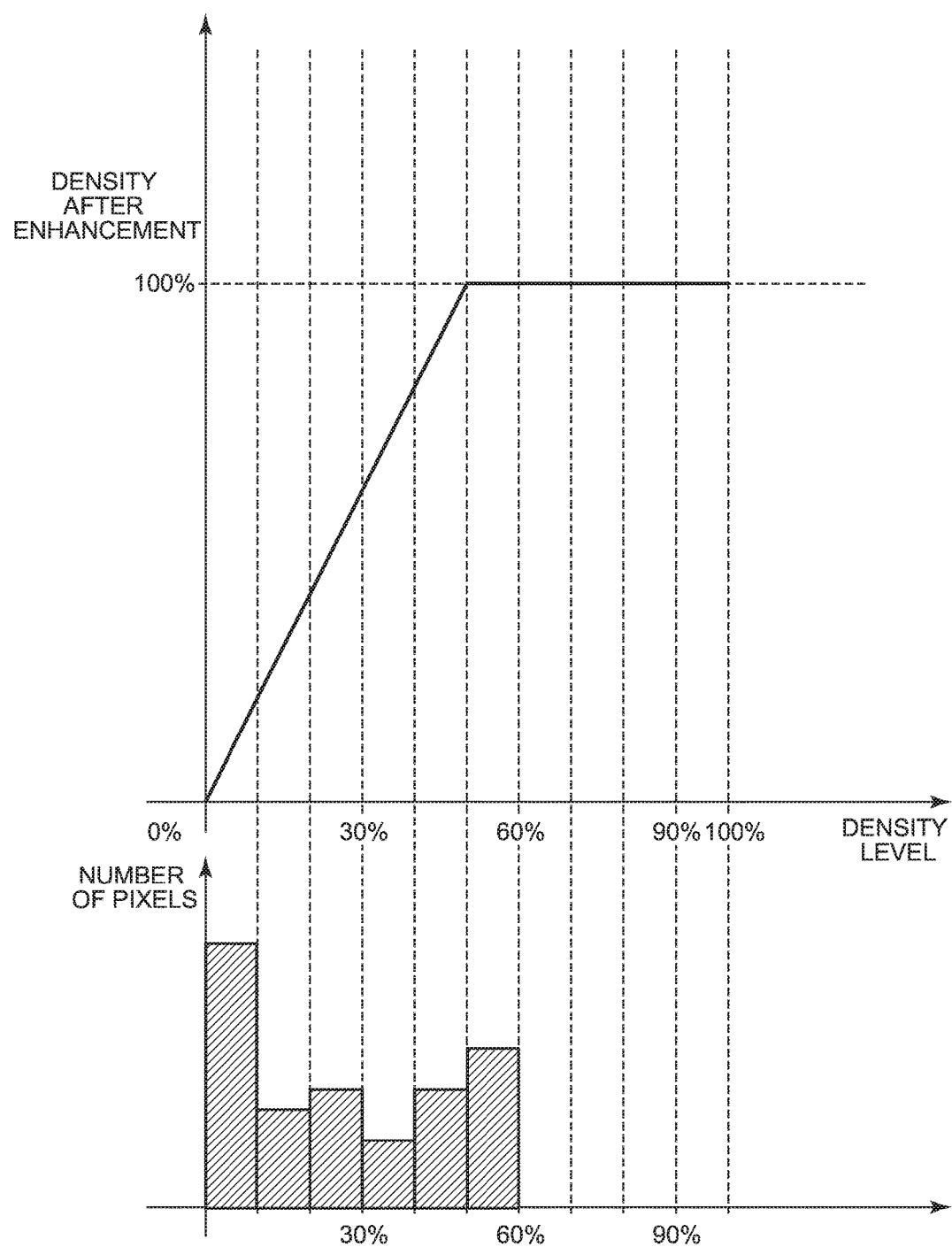
FIG. 20 is a graph illustrating an example of a conversion function upon a three-dimensional image height enhancement process and a three-dimensional image density histogram.

FIG. 20 is a graph illustrating an example of the density conversion function upon the three-dimensional image height enhancement process and the three-dimensional image density histogram.

In this example, the three-dimensional image density histogram is distributed from 0% or more and 50% or less. Data of density level 50% is indicated by the bar graph of density level 50% to 60% in the horizontal axis. Since the density histogram is distributed only in part of the whole density level range (0% to 100%), the density level is converted based on such a linear conversion function that distributes the density histogram throughout the whole density level range. In other words, the density level is corrected so that the density histogram is distributed throughout density level 0% to 100%. In this way, a sharp three-dimensional image can be obtained even when the three-dimensional image content 5 is generated by a person without sufficient consideration on three-dimensional image formation.

Figure 21:
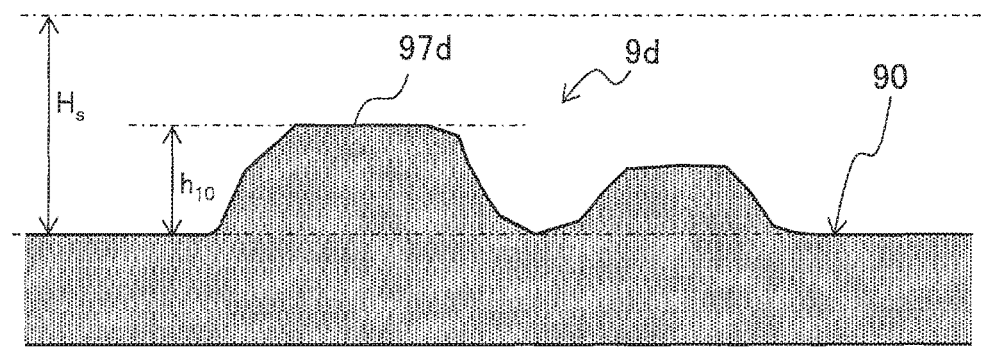
FIG. 21 is a sectional diagram of a three-dimensional image formed according to exemplary three-dimensional image content.

FIG. 21 is a sectional diagram of a three-dimensional image 9d formed according to the exemplary three-dimensional image content.

A protrusion region 97d highest in the three-dimensional image 9d has height h10 from the pre-foaming front side 90, which is about 50% of the foaming height saturation HS. In other words, only part of the foaming height range from height 0 to HS is used.

Figure 22:
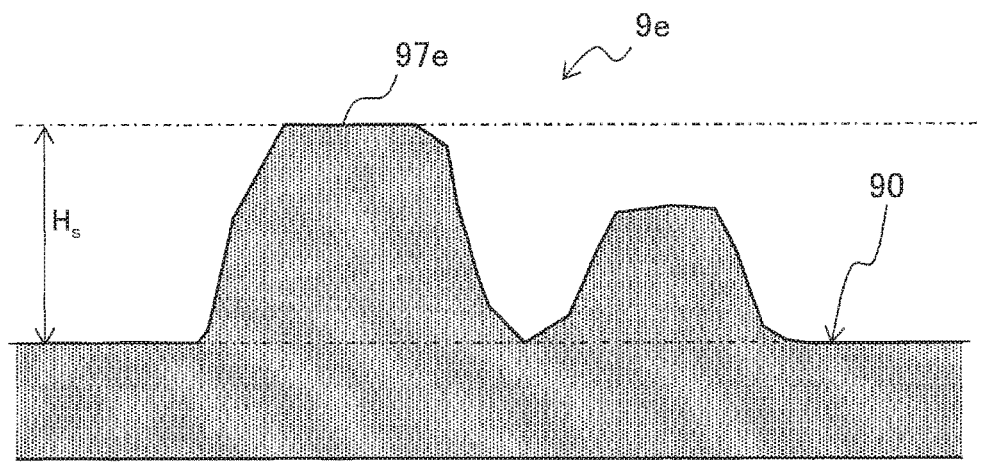
FIG. 22 is a sectional diagram of a three-dimensional image formed after a height enhancement process on the exemplary three-dimensional image content.

FIG. 22 is a sectional diagram of a three-dimensional image 9e after the height enhancement process on the exemplary three-dimensional image content.

A protrusion region 97e highest in the three-dimensional image 9e has a height approximately equal to the foaming height saturation HS from the pre-foaming front side 90. In other words, the whole foaming height range from height 0 to HS is used. The three-dimensional image formation system 1 in the second embodiment can obtain such a sharp three-dimensional image.

FIG. 23 is a graph illustrating another example of the conversion function upon the three-dimensional image height adjustment process and the three-dimensional image density histogram.

In this example, the three-dimensional image density histogram is distributed from 30% or more and 100% or less. It is assumed here that 0% or more and less than 30% are all 0%.

Since the density histogram is distributed only in part of the whole density level range (0% to 100%), the density level is converted based on such a linear conversion function that distributes the density histogram throughout the whole density level range. Here, density level 30% is converted to density level 0% by the conversion function.

Density level 40% or more and less than 50% are converted to density level 14.3%. Density level 50% or more and less than 60% are converted to density level 28.6%. Density level 60% or more and less than 70% are converted to density level 42.9%. Density level 70% or more and less than 80% are converted to density level 57.1%. Density level 80% or more and less than 90% are converted to density level 71.4%. Density level 90% or more and less than 100% are converted to density level 85.7%. Density level 100% is converted to density level 100%. By such height adjustment, the CPU 31 can distribute the density histogram throughout the whole density level range.

In this way, a sharp three-dimensional image can be obtained even when the three-dimensional image content 5 is generated by a person without sufficient consideration on three-dimensional image formation.

Figure 24:
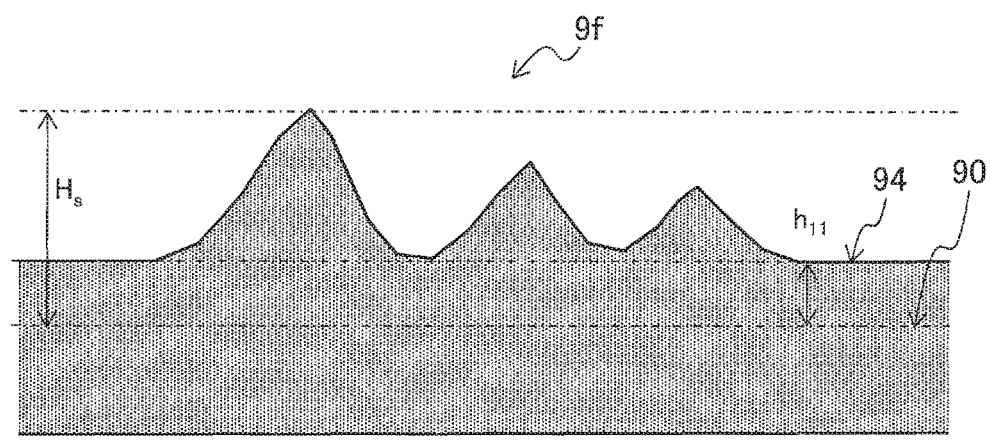
FIG. 24 is a sectional diagram of a three-dimensional image formed according to another exemplary three-dimensional image content.

FIG. 24 is a sectional diagram of a three-dimensional image 9f formed according to the other exemplary three-dimensional image content.

A protrusion region highest in the three-dimensional image 9f has a height from the pre-foaming front side 90 that is approximately equal to the foaming height saturation HS. A region lowest in the three-dimensional image 9f is a plane 94 with height h10 from the pre-foaming front side 90. The three-dimensional image 9f uses only part of the foaming height range from height 0 to HS.

Figure 25:
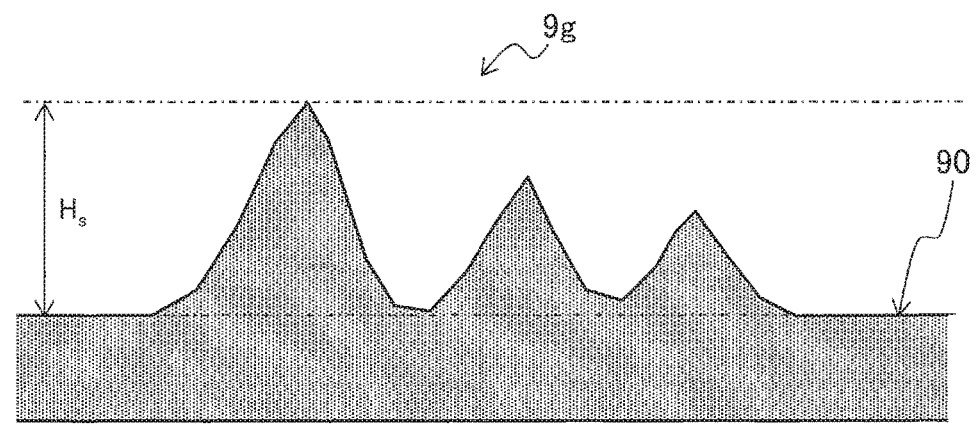
FIG. 25 is a sectional diagram of a three-dimensional image formed after a height enhancement process on the other exemplary three-dimensional image content.

FIG. 25 is a sectional diagram of a three-dimensional image 9g formed after the height enhancement process on the other exemplary three-dimensional image content.

A protrusion region highest in the three-dimensional image 9g has a height approximately equal to the foaming height saturation HS from the pre-foaming front side 90. In other words, the three-dimensional image 9g uses the whole foaming height range from height 0 to HS. The three-dimensional image formation system 1 in the second embodiment can obtain such a sharp three-dimensional image.

A third embodiment in which a linear conversion process to a favorable formation result range is performed is described below, with reference to FIGS. 26 to 32.

Ideally, the three-dimensional image formation system 1 can form a three-dimensional image of density level 0% to 100%. Actually, however, if the density level is excessively low, there is a possibility that foaming is unstable and irregularities are unrecognizable. If the density level is excessively high, there is a possibility that overfoaming occurs and the foaming resin layer cracks.

Empirically, in the case of the front side grayscale image data 51, a favorable formation result is obtained with density level 20% to 80%. In the case of the back side grayscale image data 52, a favorable formation result is obtained with density level 30% to 90%. Therefore, the density level may be adjusted to such range.

Figure 26:
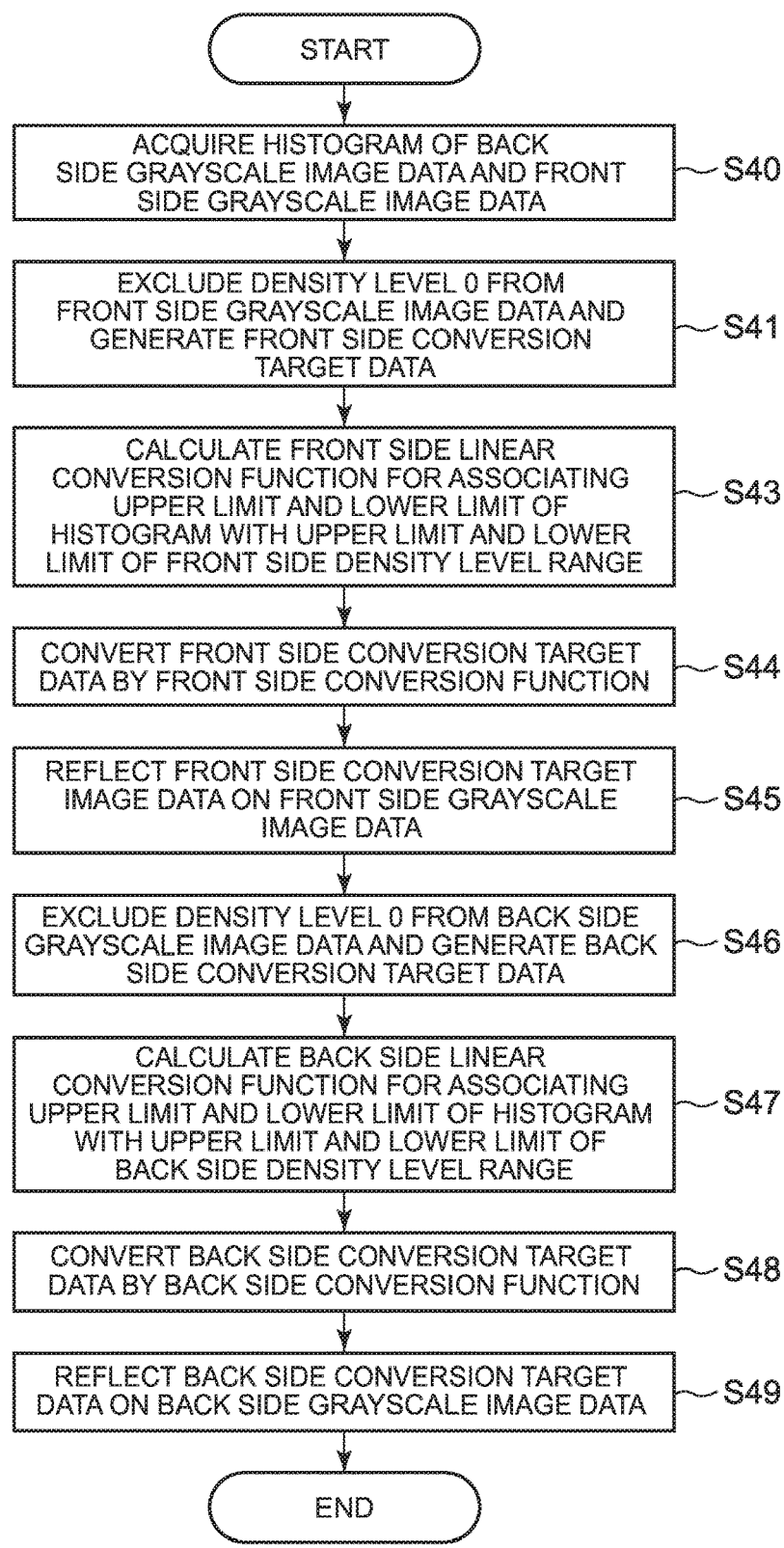
FIG. 26 is a flowchart illustrating a linear conversion process to a favorable formation result range in a third embodiment.

FIG. 26 is a flowchart illustrating a linear conversion process to the favorable formation result range in the third embodiment.

First, the CPU 31 acquires the density histogram of the back side grayscale image data 52 and the front side grayscale image data 51 (step S40). An example of the density histogram is illustrated in the below-mentioned FIG. 27.

The CPU 31 excludes data of density level 0% from the front side grayscale image data 51, and generates front side conversion target data (step S41). The region relating to density level 0% is not foamed and the foaming height is kept from being unstable, and thus the region is excluded from the conversion target data.

The conversion target data is temporarily stored in the RAM 33 (see FIG. 1).

The CPU 31 calculates a front side linear conversion function for associating the upper limit and lower limit of the histogram with the upper limit and lower limit of the front side density level range (step S43). The below-mentioned front side linear conversion function illustrated in FIG. 27 or 30 can thus be obtained.

The CPU 31 converts the front side conversion target data by the front side linear conversion function (step S44), and reflects the converted conversion target data on the front side grayscale image data 51 (step S45).

The CPU 31 then excludes data of density level 0% from the back side grayscale image data 52, and generates back side conversion target data (step S46). The conversion target data is temporarily stored in the RAM 33 (see FIG. 1). The CPU 31 calculates a back side linear conversion function for associating the upper limit and lower limit of the histogram with the upper limit and lower limit of the back side density level range (step S47). The below-mentioned back side linear conversion function illustrated in FIG. 27 or 30 can thus be obtained.

The CPU 31 converts the back side conversion target data by the back side linear conversion function (step S48), and reflects the converted conversion target data on the back side grayscale image data 52 (step S49). The CPU 31 then ends the process in FIG. 26.

To express continuously smooth gray levels for the foaming height of a three-dimensional image, the three-dimensional image formation system 1 may include data of density level 0% in the conversion target data.

The CPU 31 thus functions as a conversion unit configured to perform conversion according to density level distribution on the front side grayscale image data 51 and the back side grayscale image data 52.

Figure 27:
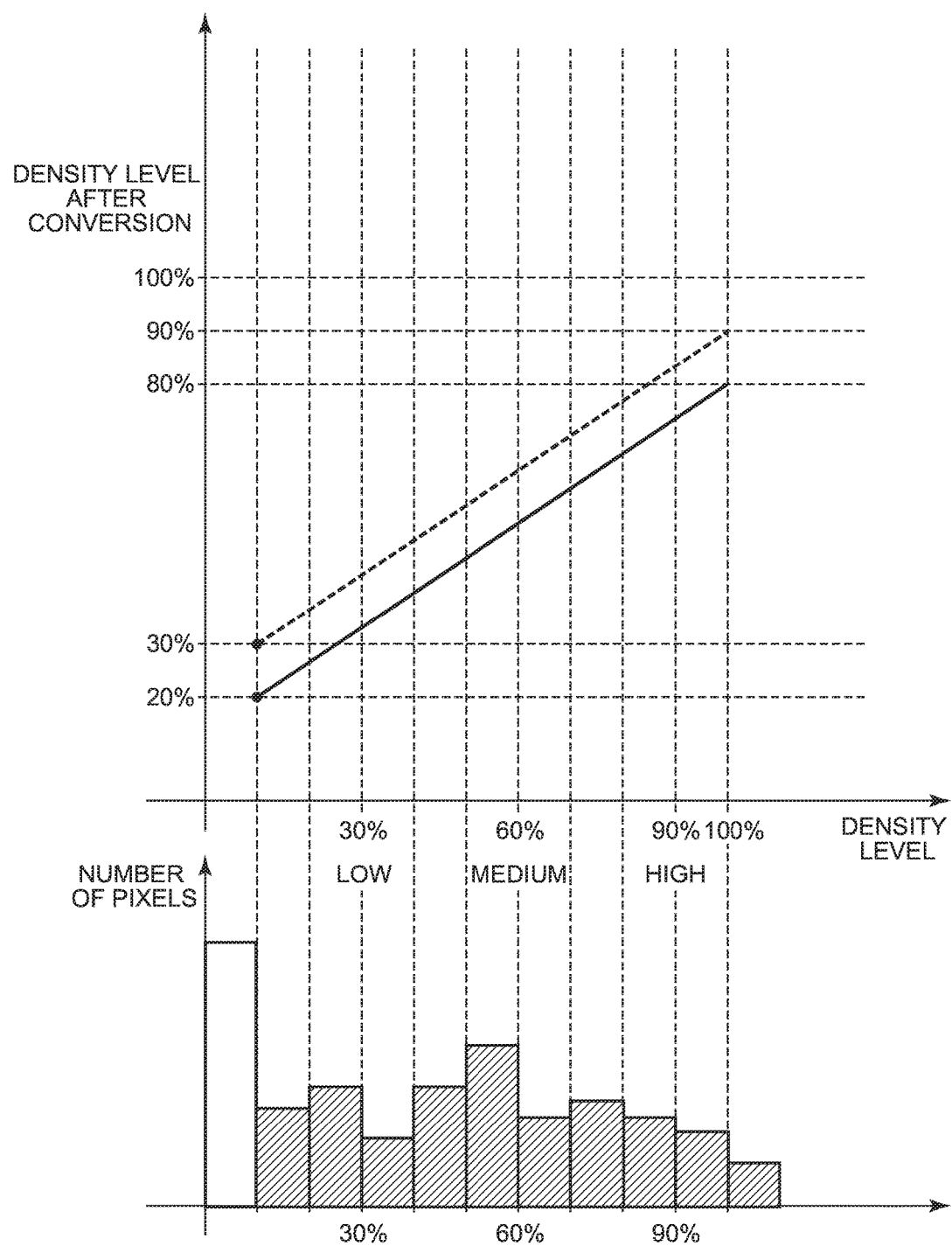
FIG. 27 is a graph illustrating an example of a conversion function upon a linear conversion process and a three-dimensional image density histogram.

FIG. 27 is a graph illustrating an example of the conversion function upon the linear conversion process and the three-dimensional image density histogram.

The three-dimensional image illustrated in FIG. 27 is, for example, computer graphics expressed in gradation. The three-dimensional image density histogram is present throughout the whole range of density 0% to 100%. The region of density 10% to 100% in such a region is the conversion target.

In the graph of the conversion function upon the linear conversion process, the front side conversion function is indicated by a solid line, and the back side conversion function is indicated by a dashed line.

The front side conversion function converts density level 10% to 100% indicated by hatching, to density level 20% to 80%. A favorable formation result is obtained in this way. In other words, foaming is stable and irregularities are recognizable, and no overfoaming occurs and so cracking is prevented. Correction is thus performed to distribute the density histogram in the density levels with which a favorable formation result is obtained.

The back side conversion function converts density level 10% to 100% indicated by hatching, to density level 30% to 90%. A favorable formation result is obtained in this way. In other words, foaming is stable and irregularities are recognizable, and no overfoaming occurs and so cracking is prevented. Correction is thus performed to distribute the density histogram in the density levels with which a favorable formation result is obtained.

Moreover, by excluding data of density level 0% from the conversion target data and leaving it as a non-foaming region, the lower limit value of the foaming height is set to 0. If data of density level 0% is included in the conversion target data, on the other hand, the lower limit value of the foaming height is a height resulting from foaming at the lower limit of the predetermined density level range in which a favorable three-dimensional image formation result is obtained. Hence, the foaming height range can be widened at its lower limit, by excluding data of density level 0% from the conversion target data.

Figure 28:
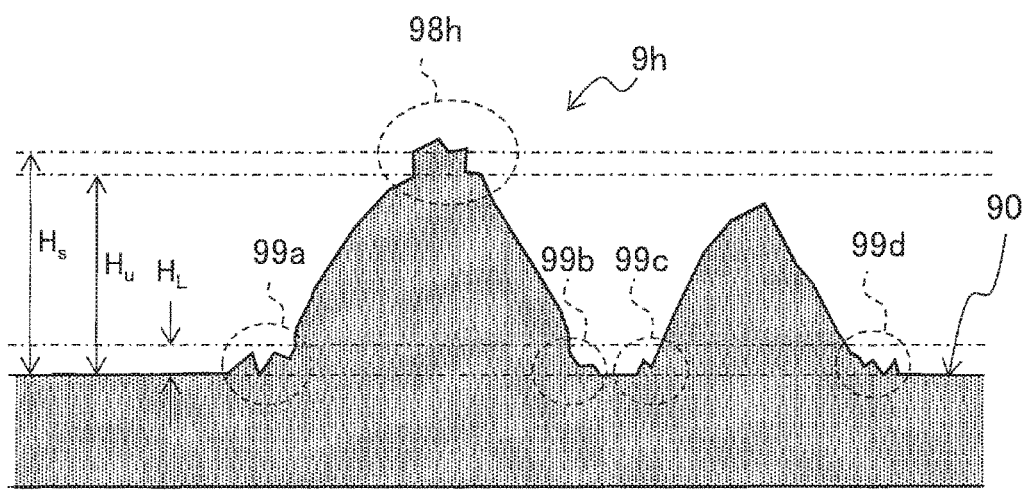
FIG. 28 is a sectional diagram of a three-dimensional image formed according to exemplary three-dimensional image content.

FIG. 28 is a sectional diagram of a three-dimensional image 9h formed according to the exemplary three-dimensional image content.

A region 98h which is a protrusion region peak in the three-dimensional image 9h is a density level region exceeding the upper limit density level at which a favorable three-dimensional image formation result is obtained, and therefore cracking due to overfoaming occurs. The height HU is a height resulting from foaming at the upper limit density level at which a favorable three-dimensional image formation result is obtained.

Protrusion region foot regions 99a to 99d are density level regions beyond the lower limit density level at which a favorable three-dimensional image formation result is obtained, and therefore foaming is unstable and irregularities are hardly recognizable. The height HL is a height resulting from foaming at the lower limit density level at which a favorable three-dimensional image formation result is obtained.

Figure 29:
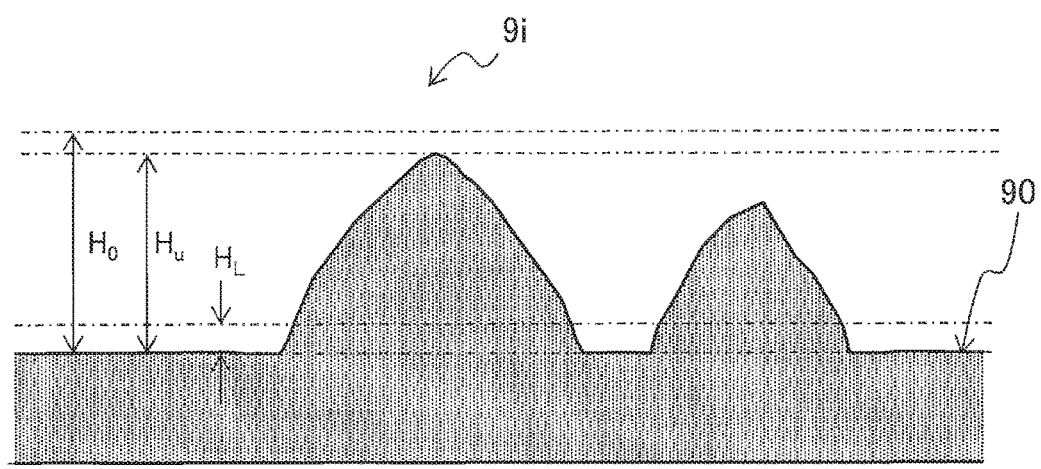
FIG. 29 is a sectional diagram of a three-dimensional image formed after a linear conversion process on the exemplary three-dimensional image content.

FIG. 29 is a sectional diagram of a three-dimensional image 9i formed after the linear conversion process on the exemplary three-dimensional image content.

The protrusion region peak of the three-dimensional image 9i is height HU or less, so that no overfoaming occurs and cracking is prevented. The protrusion region rises steeply, and there is hardly any region with height HL, so that foaming is stable and irregularities are recognizable. Thus, the three-dimensional image formation system 1 can form a favorable three-dimensional image 9i.

Figure 30:
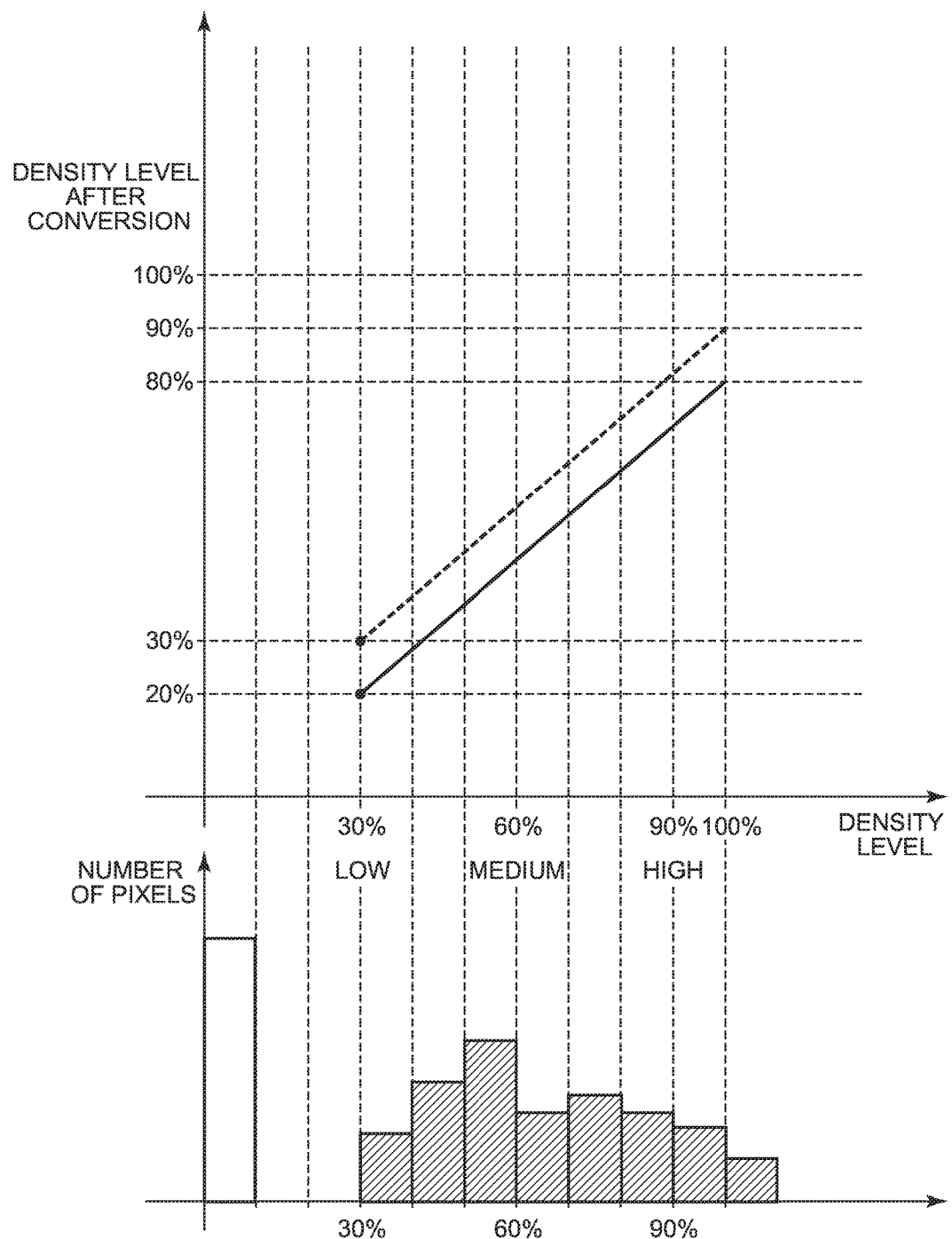
FIG. 30 is a graph illustrating another example of a conversion function upon a linear conversion process and a three-dimensional image density histogram.

FIG. 30 is a graph illustrating another example of the conversion function upon the linear conversion process and the three-dimensional image density histogram.

The three-dimensional image is, for example, a manually drawn picture, and the three-dimensional image density histogram does not include density of 0% or more and less than 30%.

In the graph of the conversion function upon the linear conversion process, the front side conversion function is indicated by a solid line, and the back side conversion function is indicated by a dashed line.

The front side conversion function converts density level 30% to 100%, to density level 20% to 80%. A favorable formation result is obtained in this way. In other words, foaming is stable and irregularities are recognizable, and no overfoaming occurs and so cracking is prevented. Correction is thus performed to distribute the density histogram in the density levels with which a favorable formation result is obtained.

The back side conversion function converts density level 30% to 100%, to density level 30% to 90%. A favorable formation result is obtained in this way. In other words, foaming is stable and irregularities are recognizable, and no overfoaming occurs and so cracking is prevented. Correction is thus performed to distribute the density histogram in the density levels with which a favorable formation result is obtained.

Figure 31:
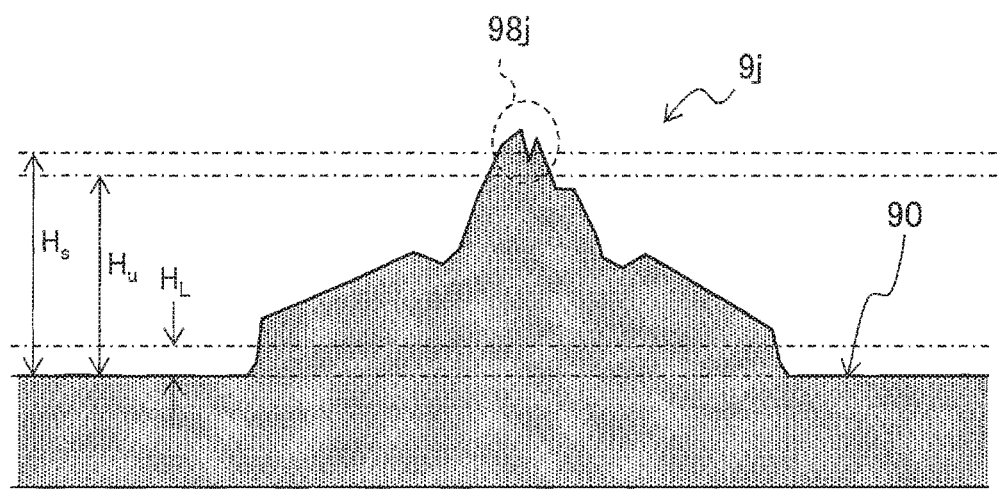
FIG. 31 is a sectional diagram of a three-dimensional image formed according to another exemplary three-dimensional image content.

FIG. 31 is a sectional diagram of a three-dimensional image 9j formed according to the other exemplary three-dimensional image content.

A region 98j which is a protrusion region peak in the three-dimensional image 9j is a density level region exceeding the upper limit density level at which a favorable three-dimensional image formation result is obtained, and therefore cracking due to overfoaming occurs. In this example, the protrusion region rises steeply, and there is hardly any region with height HL, so that foaming is stable and irregularities are recognizable. Thus, the three-dimensional image formation system 1 can form a favorable three-dimensional image 9j.

Figure 32:
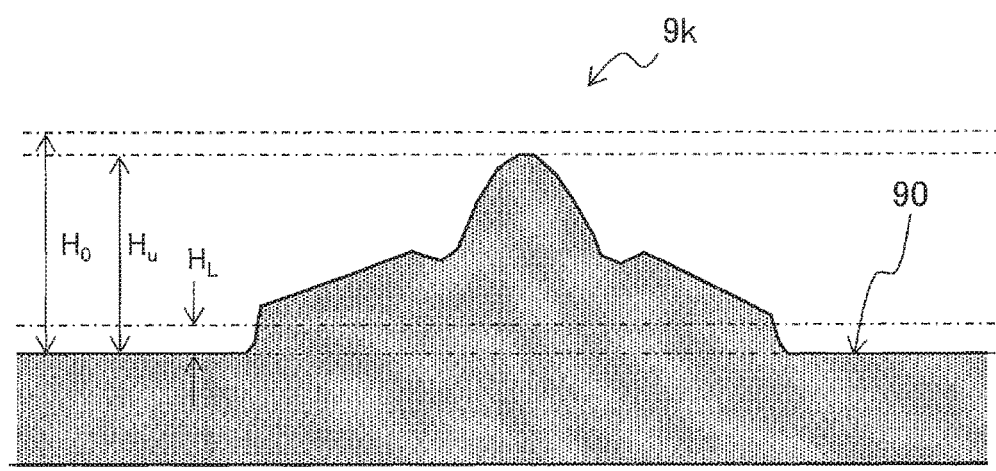
FIG. 32 is a sectional diagram of a three-dimensional image formed after a linear conversion process on the other exemplary three-dimensional image content.

FIG. 32 is a sectional diagram of a three-dimensional image 9k formed after the linear conversion process on the other exemplary three-dimensional image content.

The protrusion region peak of the three-dimensional image 9k is height HU or less, so that no overfoaming occurs and cracking is prevented. Thus, the three-dimensional image formation system 1 can form a favorable three-dimensional image 9k.

Figure 33:
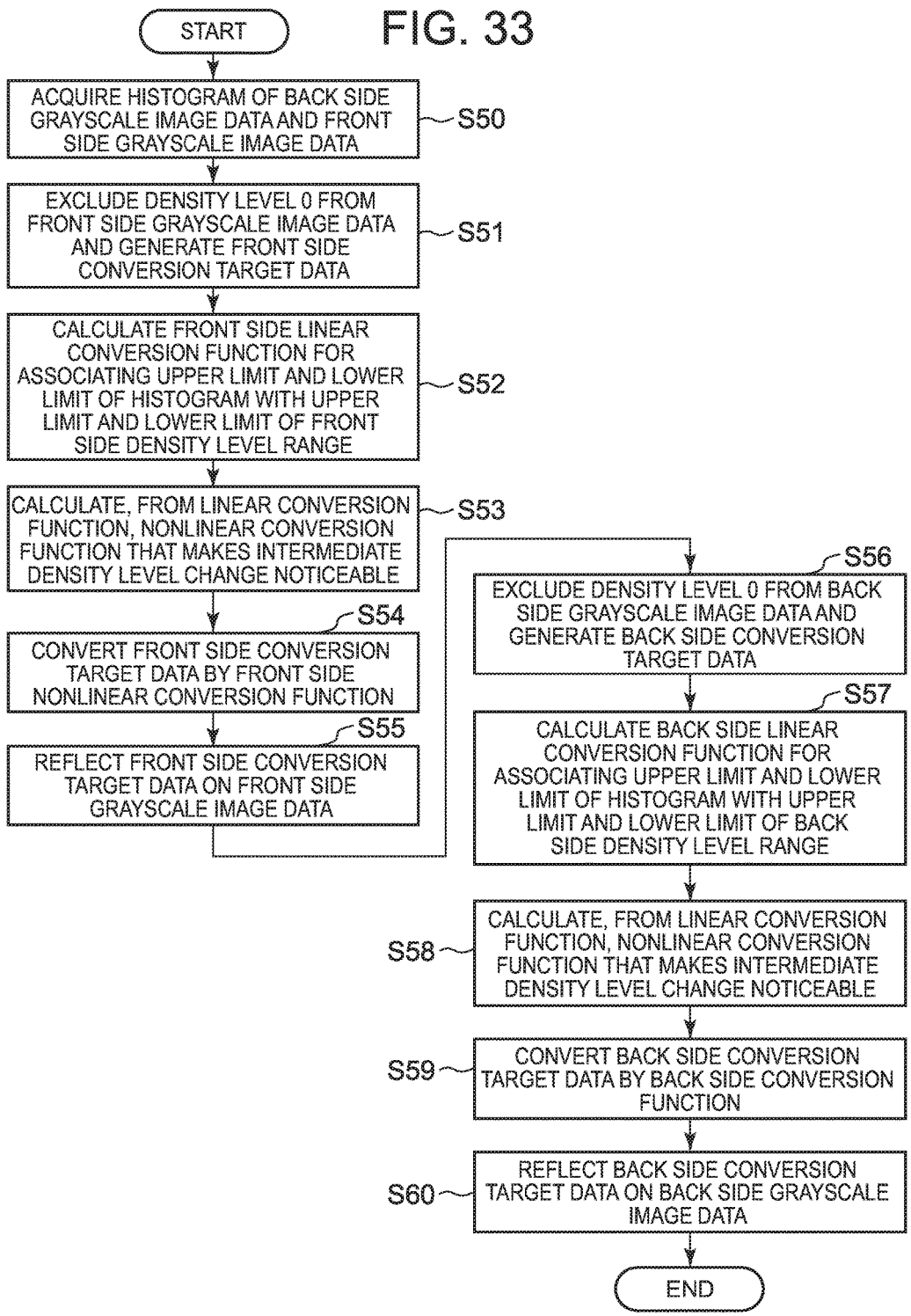
FIG. 33 is a flowchart illustrating a nonlinear conversion process that makes a density level change at a predetermined position in a density level range more noticeable in a fourth embodiment.

A fourth embodiment in which a nonlinear conversion process to a favorable formation result range is performed is described below, with reference to FIGS. 33 to 36. FIG. 33 is a flowchart illustrating a nonlinear conversion process that makes a density level change at an intermediate position in the density level range more noticeable in the fourth embodiment.

First, the CPU 31 acquires the density histogram of the back side grayscale image data 52 and the front side grayscale image data 51 (step S50). An example of the density histogram is illustrated in the below-mentioned FIG. 34. The CPU 31 excludes data of density level 0% from the front side grayscale image data 51, and generates front side conversion target data (step S51). The conversion target data is temporarily stored in the RAM 33 (see FIG. 1).

The CPU 31 calculates a front side linear conversion function for associating the upper limit and lower limit of the histogram with the upper limit and lower limit of the front side density level range (step S52). The CPU 31 calculates, from the front side linear conversion function, a nonlinear conversion function that makes a density level change at an intermediate position noticeable (step S53). Such a nonlinear conversion function is approximately an S-shaped curve. The below-mentioned front side nonlinear conversion function illustrated in FIG. 34 can thus be obtained.

The CPU 31 converts the front side conversion target data by the front side nonlinear conversion function (step S54), and reflects the converted conversion target data on the front side grayscale image data 51 (step S55).

The CPU 31 then excludes data of density level 0% from the back side grayscale image data 52, and generates back side conversion target data (step S56). The conversion target data is temporarily stored in the RAM 33 (see FIG. 1). The CPU 31 calculates a back side linear conversion function for associating the upper limit and lower limit of the histogram with the upper limit and lower limit of the back side density level range (step S57). The CPU 31 calculates, from the back side linear conversion function, a nonlinear conversion function that makes a density level change at an intermediate position noticeable (step S58). Such a nonlinear conversion function is approximately an S-shaped curve. The below-mentioned back side nonlinear conversion function illustrated in FIG. 34 can thus be obtained.

The CPU 31 converts the back side conversion target data by the back side nonlinear conversion function (step S59), and reflects the converted conversion target data on the back side grayscale image data 52 (step S60). The CPU 31 then ends the process in FIG. 33.

The CPU 31 thus functions as a conversion unit configured to perform conversion according to density level distribution on the front side grayscale image data 51 and the back side grayscale image data 52.

Figure 34:
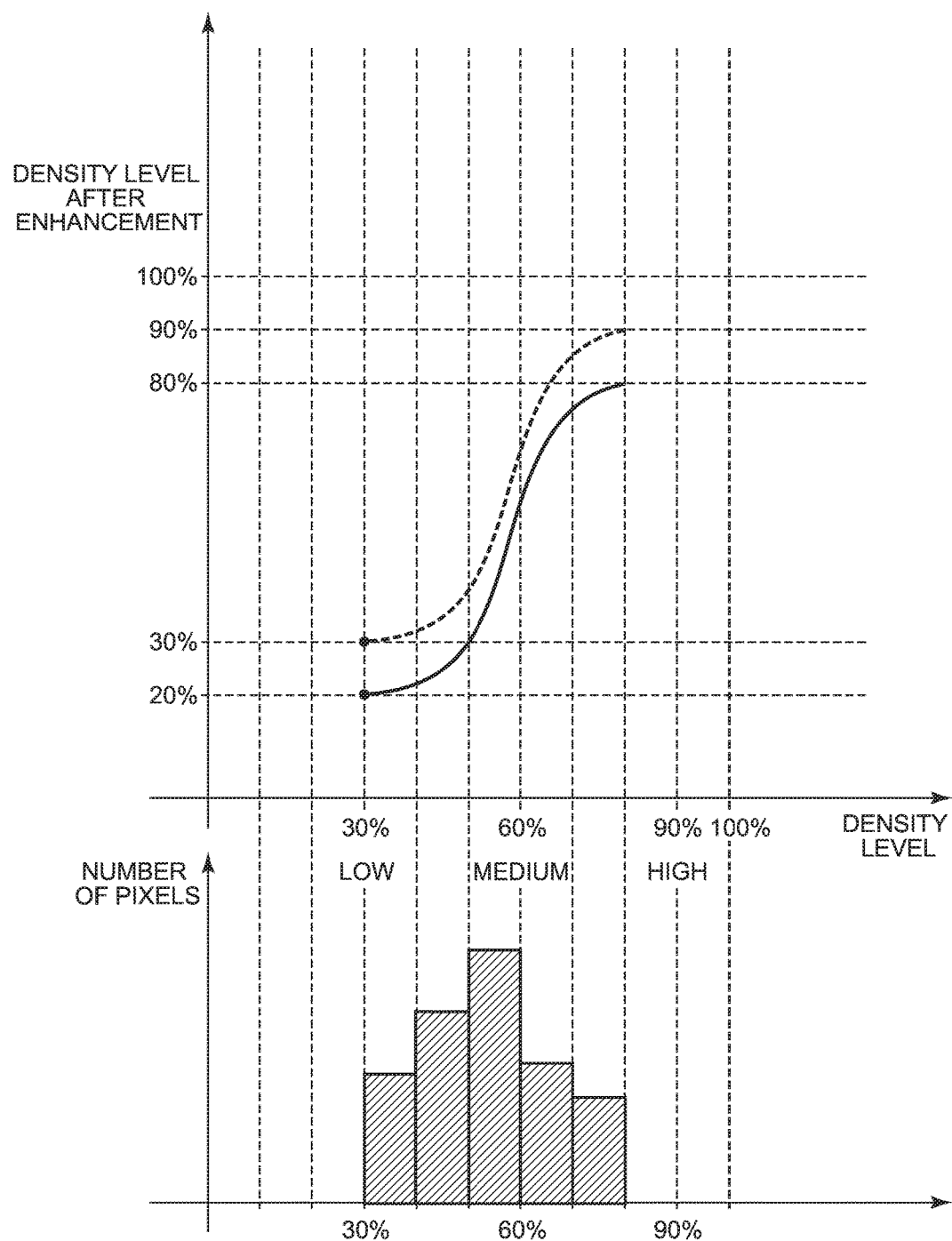
FIG. 34 is a graph illustrating an example of a conversion function upon a nonlinear conversion process and a three-dimensional image density histogram.

FIG. 34 is a graph illustrating an example of the conversion function upon the nonlinear conversion process and the three-dimensional image density histogram.

The three-dimensional image illustrated in FIG. 34 is, for example, a photograph. The three-dimensional image density histogram is present in the region of density level 30% to 80%, and has a shape like a normal distribution where the intermediate density level forms a large mountain.

In the graph of the conversion function upon the nonlinear conversion process, the front side conversion function is indicated by a solid line, and the back side conversion function is indicated by a dashed line.

The front side conversion function nonlinearly converts density level 30% to 80%, to density level 20% to 80%. In other words, correction is performed so that the density level change at the intermediate position in the density level range is more noticeable. As a result, a favorable formation result is obtained, and the difference in intermediate foaming height where the number of pixels is large becomes clear, making the three-dimensional image sharp. A three-dimensional image that has good contrast as a whole and a clear difference in height as a whole is thus obtained.

The back side conversion function nonlinearly converts density level 30% to 80%, to density level 30% to 90%. In other words, correction is performed so that the density level change at the intermediate position in the density level range is more noticeable. As a result, a favorable formation result is obtained, and the difference in intermediate foaming height where the amount of data is large becomes clear, making the three-dimensional image sharp. A three-dimensional image that has good contrast as a whole and a clear difference in height as a whole is thus obtained.

The position at which the density level change is made noticeable by the nonlinear conversion function is not limited to the intermediate position in the density level range, and may be any position (predetermined position). Hence, a three-dimensional image with a clear difference in height at any position can be formed.

Figure 35:
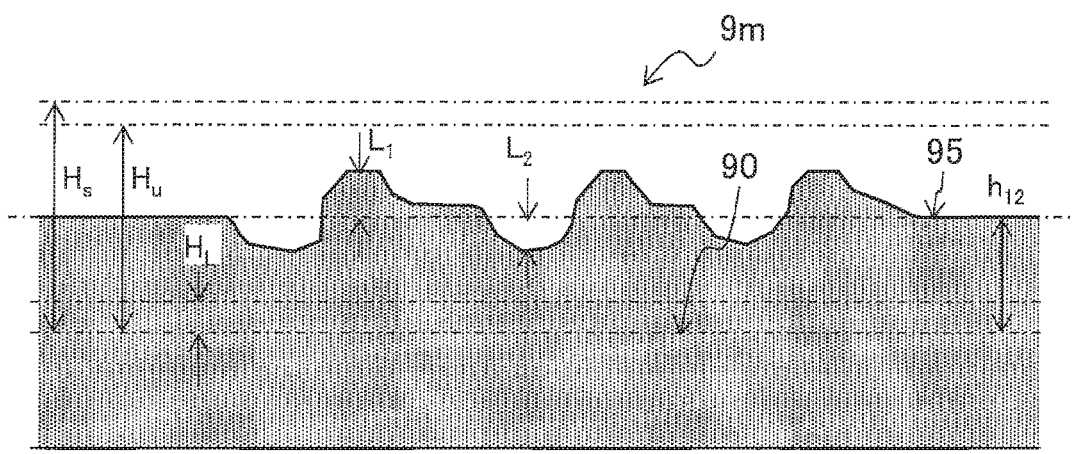
FIG. 35 is a sectional diagram of a three-dimensional image formed according to exemplary three-dimensional image content.

FIG. 35 is a sectional diagram of a three-dimensional image 9m formed according to the exemplary three-dimensional image content.

The three-dimensional image 9m has, centering on a plane 95 with foaming height h12, protrusions with height L1 from the plane 95 and depressions with depth L2 from the plane 95.

Figure 36:
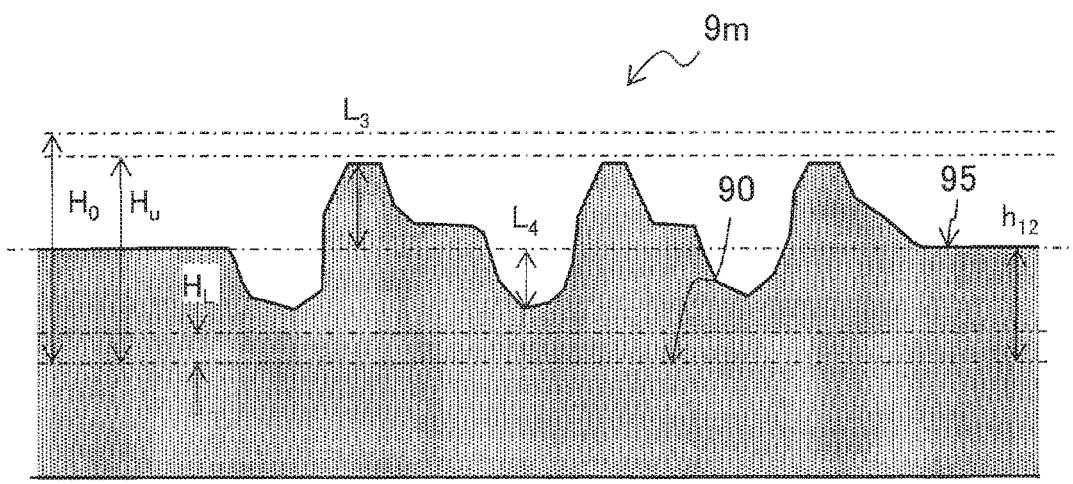
FIG. 36 is a sectional diagram of a three-dimensional image formed after a nonlinear conversion process on the exemplary three-dimensional image content.

FIG. 36 is a sectional diagram of a three-dimensional image 9n formed after the nonlinear conversion process on the exemplary three-dimensional image content.

The three-dimensional image 9n has, centering on the plane 95 with foaming height h12, protrusions with height L3 from the plane 95 and depressions with depth L4 from the plane 95. Height L3 is greater than original height L1, and depth L4 is greater than original depth L2. Thus, the three-dimensional image formation system 1 can form the three-dimensional image 9n with a clear difference in intermediate foaming height where the number of pixels is large.

(Modifications)

The present invention is not limited to the foregoing embodiments, and changes can be made without departing from the scope of the present invention. For example, the following modifications (a) to (c) are possible.

(a) The case where the density level in the grayscale image data is not in the density level range in which a three-dimensional image is formable includes the case where density is converted in response to enlargement resizing. The case where the density level in the grayscale image data is not in the density level range in which a three-dimensional image is formable may be any case where, for some reason, generated, converted, edited, or capture data is not in the density level range in which a three-dimensional image is formable.

(b) The predetermined density level range in which a favorable formation result is obtained in the foregoing embodiments is the range in which foaming is stable and irregularities are recognizable and also no overfoaming occurs and so cracking is prevented. The predetermined density level range is, however, not limited to this, and may be, for example, the range in which the relationship between the density level and the foaming height maintains linearity.

(c) The three-dimensional image content 5 in the foregoing embodiments includes the front side grayscale image data 51, the back side grayscale image data 52, and the picture pattern data 53. The three-dimensional image content is, however, not limited to this, and may be the front side grayscale image data 51 alone, the back side grayscale image data 52 alone, a combination of the front side grayscale image data 51 and the picture pattern data 53, or a combination of the back side grayscale image data 52 and the picture pattern data 53.

What is claimed is:

1. A three-dimensional image data generation system comprising:
    a hardware processor which, under control of a stored program, executes processes comprising:
        an editing process of editing grayscale image data in which a density level for specifying a foaming height of a thermally expandable sheet is set for each coordinate in a planar direction; and
        a conversion process of, when the editing process changes a size in the planar direction of an image region included in the grayscale image data, converting the density level in correspondence with a ratio of the image region between before and after the change,
    wherein in a case where a density level in the grayscale image data after the conversion is expected to be not in a density level range in which a three-dimensional image is formable, the conversion process corrects and converts the density level so that the whole grayscale image data is in the density level range in which a three-dimensional image is formable.

2. The three-dimensional image data generation system according to claim 1, wherein in a case where the density level in the grayscale image data after the conversion is expected to be distributed only in a part of the density level range in which a three-dimensional image is formable, the conversion process corrects and converts the density level so that the whole grayscale image data is distributed throughout the whole density level range in which a three-dimensional image is formable.

3. The three-dimensional image data generation system according to claim 1, wherein the conversion process corrects and converts the density level so that a density distribution of the grayscale image data is in a predetermined density level range.

4. The three-dimensional image data generation system according to claim 3, wherein the conversion process linearly corrects and converts the density level so that an upper limit and a lower limit of the density level range in which a three-dimensional image is formable are respectively an upper limit and a lower limit of the predetermined density level range.

5. The three-dimensional image data generation system according to claim 3, wherein the conversion process corrects and converts the density level so that a density level change at a predetermined position in a density level range is more noticeable.

6. The three-dimensional image data generation system according to claim 1, wherein the conversion process sets data exceeding a density level 0 as a conversion target and excludes data of the density level 0 from the conversion target, from among density levels in the grayscale image data.

7. A three-dimensional image data generation method comprising:
    editing grayscale image data in which a density level for specifying a foaming height of a thermally expandable sheet is set for each coordinate in a planar direction; and
    when the editing changes a size in the planar direction of an image region included in the grayscale image data, converting the density level in correspondence with a ratio of the image region between before and after the change,
    wherein in a case where a density level in the grayscale image data after the conversion is expected to be not in a density level range in which a three-dimensional image is formable, the converting corrects and converts the density level so that the whole grayscale image data is in the density level range in which a three-dimensional image is formable.

8. The three-dimensional image data generation method according to claim 7, wherein in a case where the density level in the grayscale image data after the conversion is expected to be distributed only in a part of the density level range in which a three-dimensional image is formable, the converting corrects and converts the density level so that the whole grayscale image data is distributed throughout the whole density level range in which a three-dimensional image is formable.

9. The three-dimensional image data generation method according to claim 7, wherein the converting corrects and converts the density level so that a density distribution of the grayscale image data is in a predetermined density level range.

10. The three-dimensional image data generation method according to claim 9, wherein the converting linearly corrects and converts the density level so that an upper limit and a lower limit of the density level range in which a three-dimensional image is formable are respectively an upper limit and a lower limit of the predetermined density level range.

11. The three-dimensional image data generation method according to claim 7, wherein the converting sets data exceeding a density level 0 as a conversion target and excludes data of the density level 0 from the conversion target, from among density levels in the grayscale image data.

12. A non-transitory computer-readable recording medium having stored thereon a program executable by a computer of a three-dimensional image data generation system, the program causing the computer to perform a procedure comprising:
    an editing process of editing grayscale image data in which a density level for specifying a foaming height of a thermally expandable sheet is set for each coordinate in a planar direction; and
    a conversion process of, when a size in the planar direction of an image region included in the grayscale image data is changed, converting the density level in correspondence with a ratio of the image region between before and after the change,
    wherein in a case where a density level in the grayscale image data after the conversion is expected to be not in a density level range in which a three-dimensional image is formable, the conversion process corrects and converts the density level so that the whole grayscale image data is in the density level range in which a three-dimensional image is formable.

13. The non-transitory computer-readable recording medium according to claim 12, wherein in a case where the density level in the grayscale image data after the conversion is expected to be distributed only in a part of the density level range in which a three-dimensional image is formable, the conversion process corrects and converts the density level so that the whole grayscale image data is distributed throughout the whole density level range in which a three-dimensional image is formable.

14. The non-transitory computer-readable recording medium according to claim 12, wherein the conversion process corrects and converts the density level so that a density distribution of the grayscale image data is in a predetermined density level range.

15. The non-transitory computer-readable recording medium according to claim 14, wherein the conversion process linearly corrects and converts the density level so that an upper limit and a lower limit of the density level range in which a three-dimensional image is formable are respectively an upper limit and a lower limit of the predetermined density level range.

16. The non-transitory computer-readable recording medium according to claim 14, wherein the conversion process corrects and converts the density level so that a density level change at a predetermined position in a density level range is more noticeable.

17. The non-transitory computer-readable recording medium according to claim 12, wherein the conversion process sets data exceeding a density level 0 as a conversion target and excludes data of the density level 0 from the conversion target, from among density levels in the grayscale image data.

* * * * *